United States Patent [19]

Hornung

[11] 4,418,398

[45] Nov. 29, 1983

[54] MANUAL RESET CONTROL CIRCUIT FOR MICROPROCESSOR CONTROLLED WASHING APPLIANCE

[75] Inventor: Richard E. Hornung, Louisville, Ky.

[73] Assignee: General Electric Company, Louisville, Ky.

[21] Appl. No.: 387,134

[22] Filed: Jun. 10, 1982

Related U.S. Application Data

[63] Continuation of Ser. No. 71,964, Sep. 4, 1979, abandoned.

[51] Int. Cl.³ ............................................. G06F 15/46
[52] U.S. Cl. .................................... 364/900; 364/141
[58] Field of Search ............... 364/200, 900, 400, 141, 364/143, 146

[56] References Cited

U.S. PATENT DOCUMENTS

| 3,790,815 | 2/1974 | Karklys | 364/104 X |
| 3,868,648 | 2/1975 | Levin | 364/900 |
| 3,922,889 | 12/1975 | Karklys | 364/104 X |
| 3,937,981 | 2/1976 | Nystuen | 364/104 X |
| 4,003,028 | 1/1977 | Bennett | 364/200 |
| 4,184,347 | 1/1980 | Tobita | 364/400 X |

Primary Examiner—Raulfe B. Zache
Assistant Examiner—David Y. Eng
Attorney, Agent, or Firm—H. Neil Houser; Radford M. Reams

[57] ABSTRACT

A control circuit is disclosed for appliances such as dishwashers and clothes washers employing a microprocessor programmed to respond to user selected options to determine the operating sequence of the appliance. The control circuit includes a manually operable switch which when actuated generates a reset signal which interrupts or cancels appliance operation by resetting the microprocessor and additionally generates an initiating signal which when detected by the microprocessor following reset, causes the microprocessor to initiate a drain cycle to remove any water present in the appliance as part of the reset program routine.

9 Claims, 28 Drawing Figures

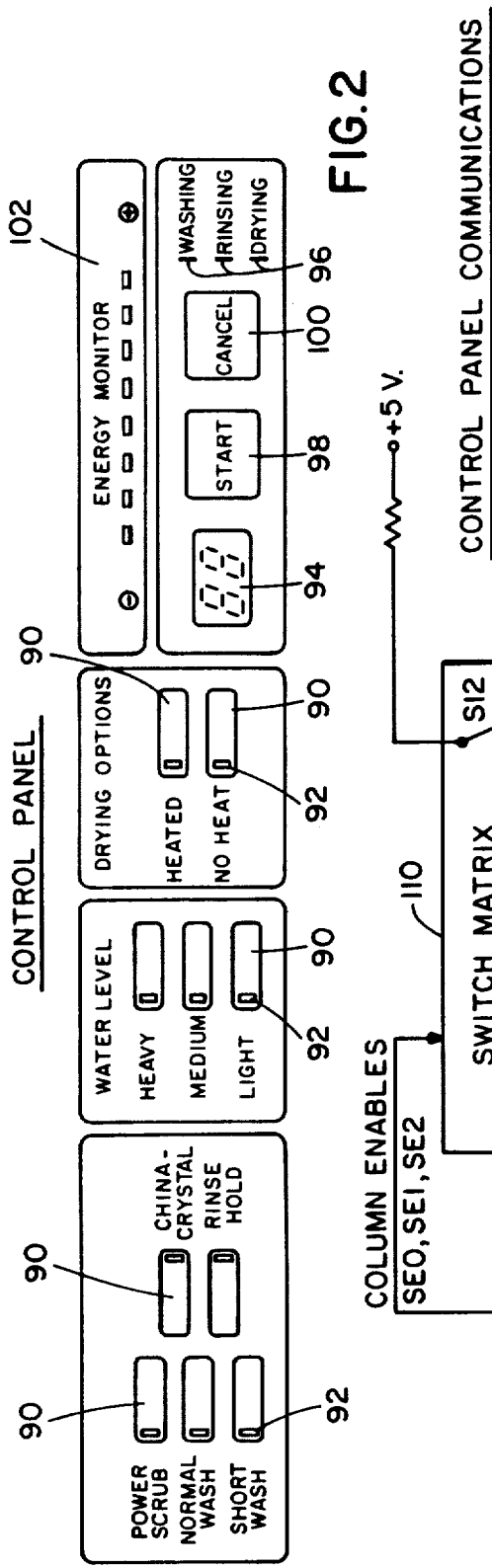
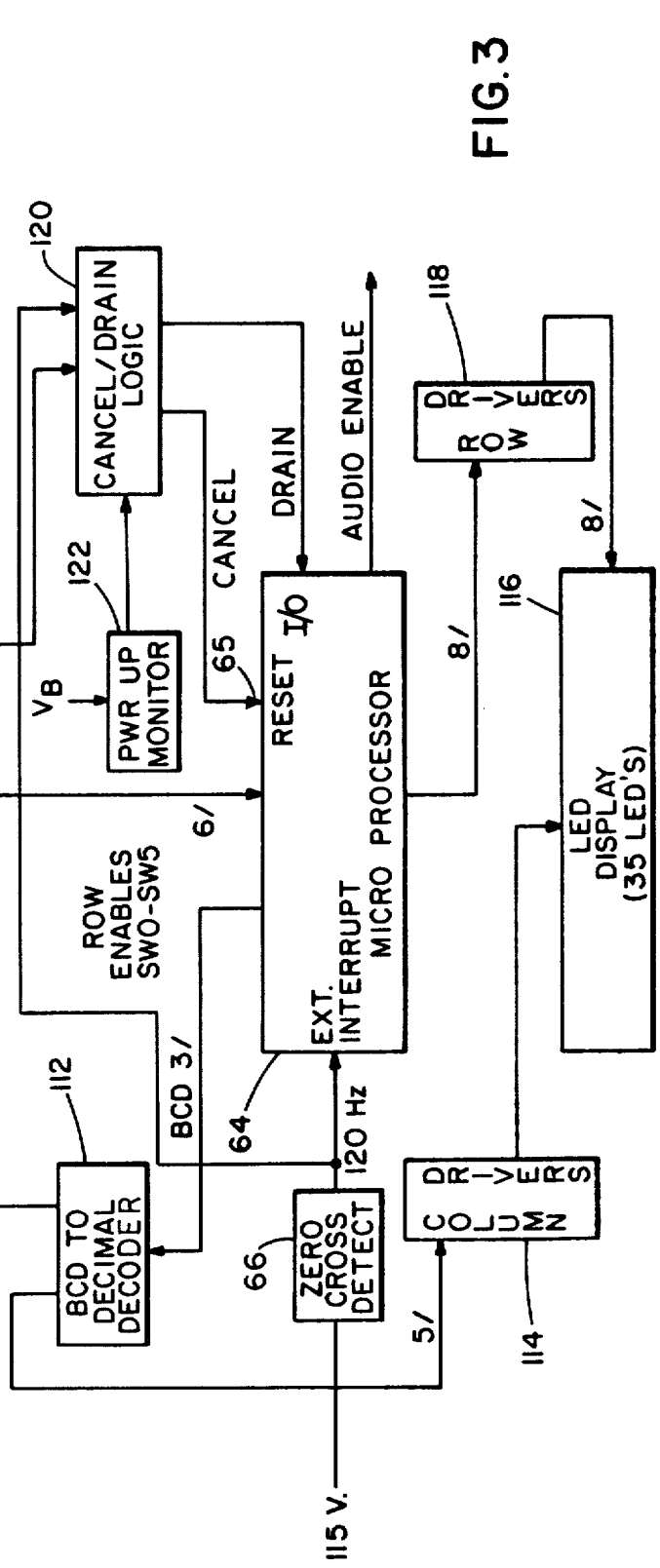

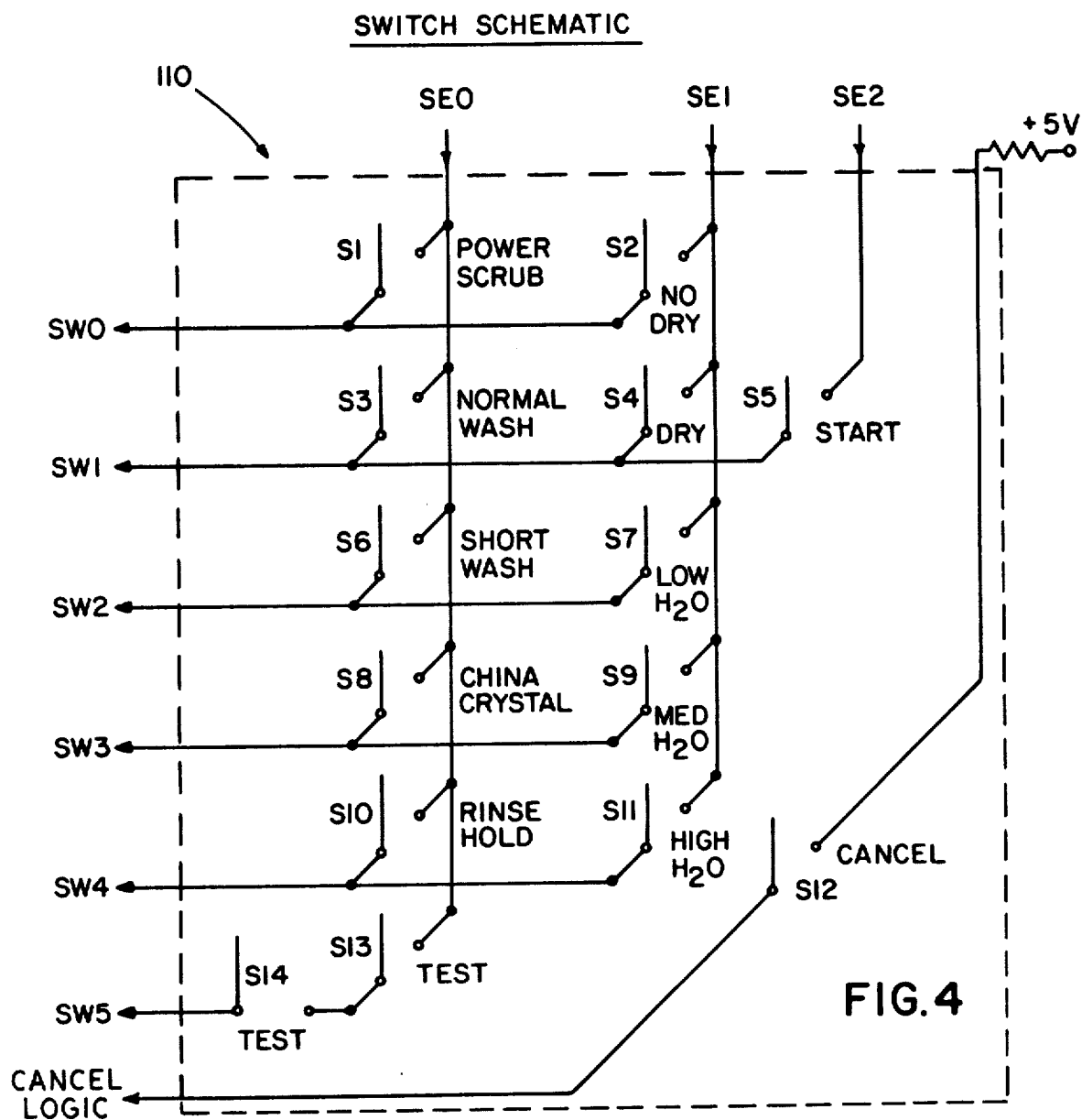
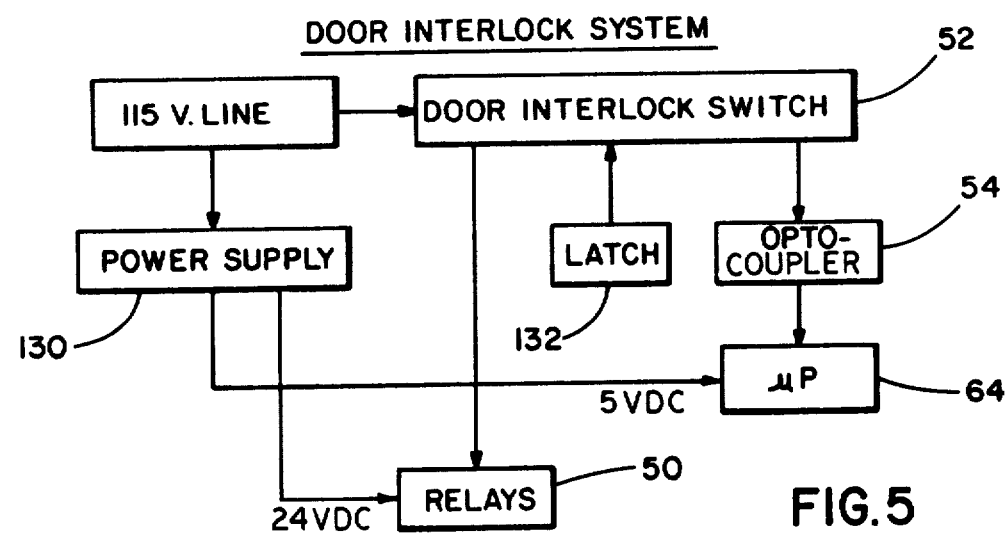

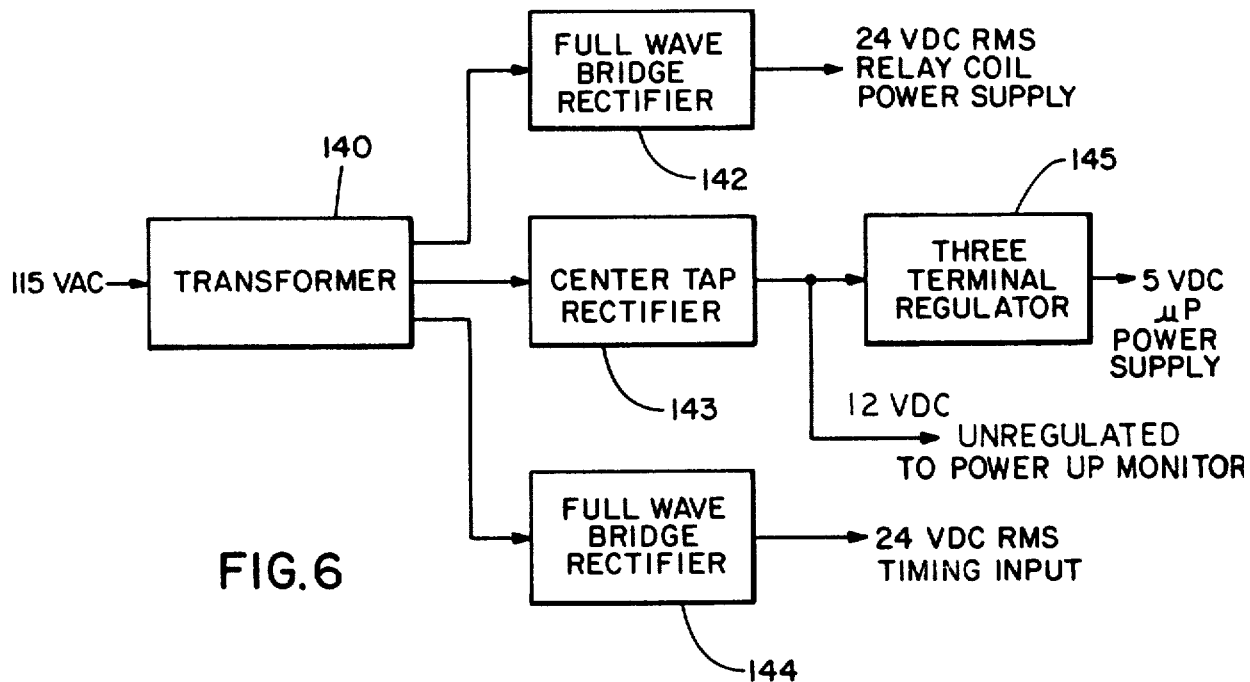
FIG.6
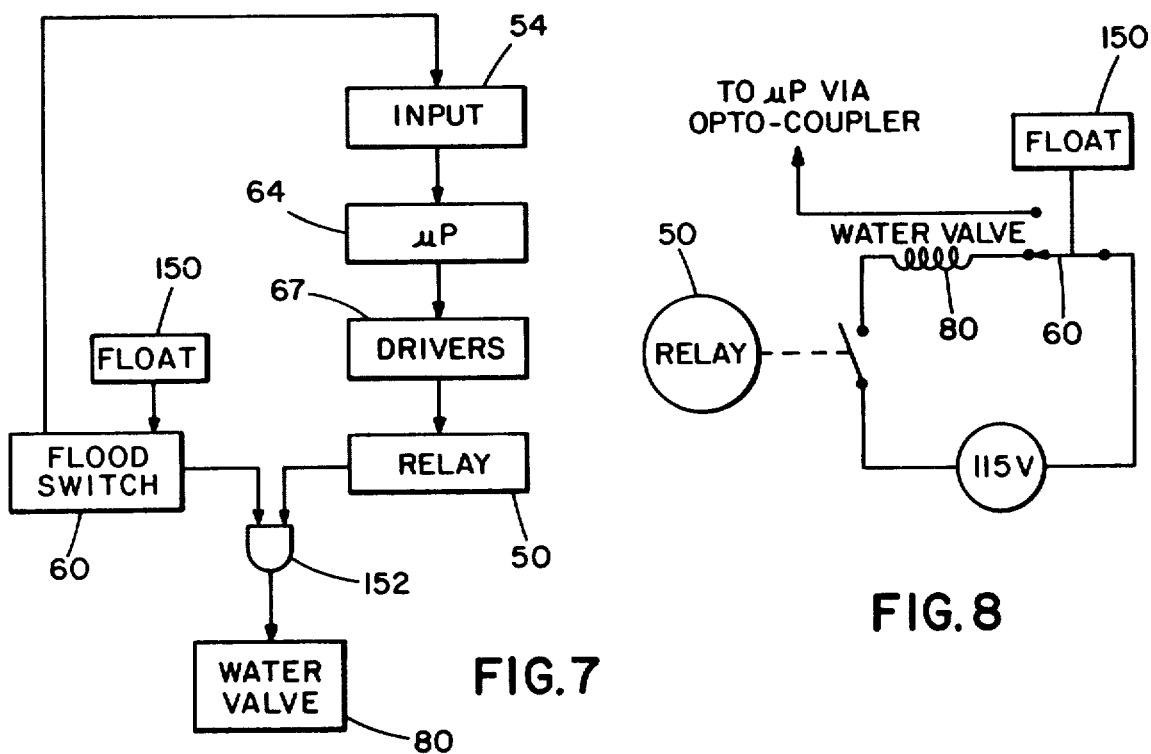
FIG.7
FIG.8

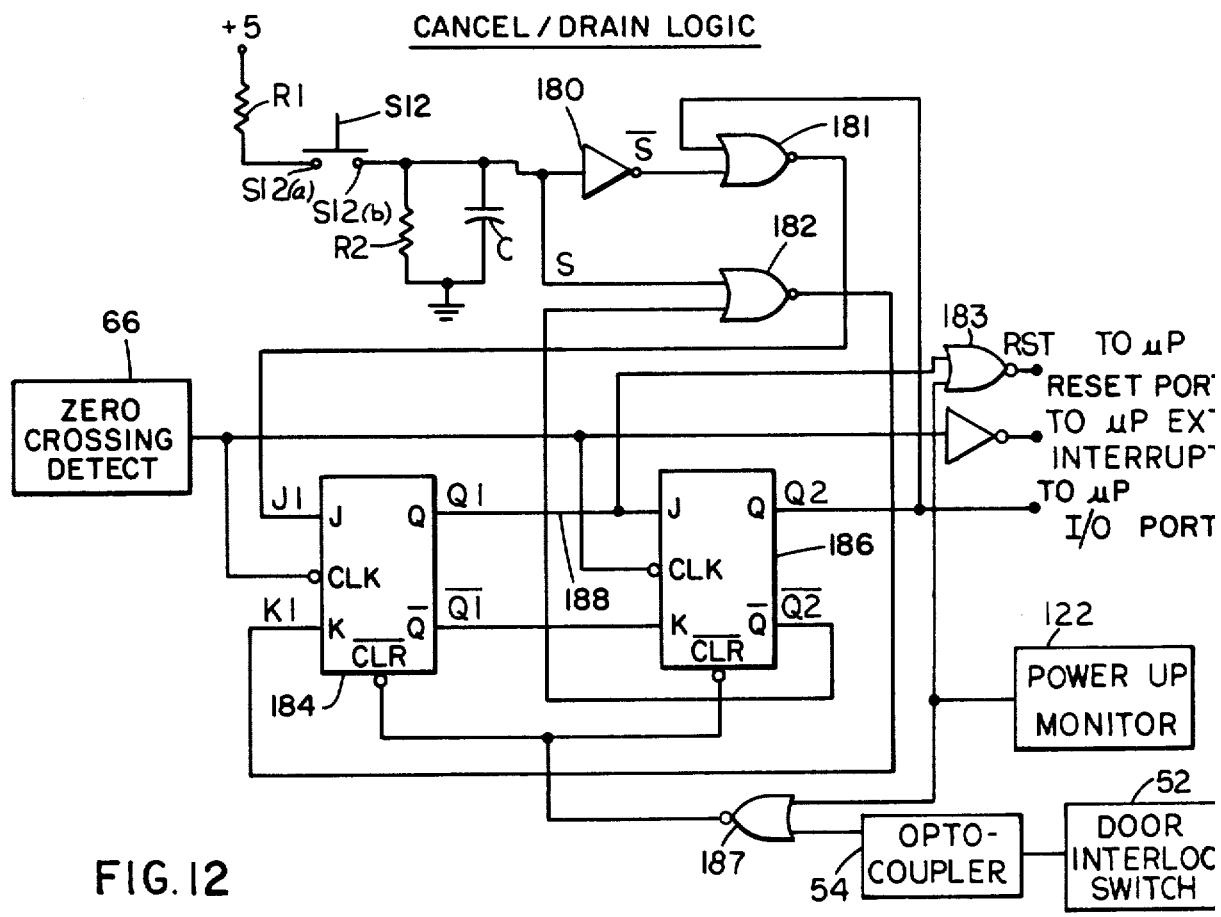

MANUAL RESET CONTROL CIRCUIT FOR MICROPROCESSOR CONTROLLED WASHING APPLIANCE

This is a continuation of application Ser. No. 071,964, filed Sept. 4, 1979 now abandoned.

CROSS REFERENCE TO RELATED APPLICATIONS

The control circuit of this invention is described in the following commonly assigned U.S. Pat. Nos. all filed Dec. 18, 1978: 4,241,400, "Microprocessor Based Control Circuit for Washing Appliances"; 4,245,310, "Microprocessor Based Control Circuit for Washing Appliances with Overfill Protection"; and 4,245,309, "Microprocessor Based Control Circuit for Washing Appliances with Diagnostic System"; all filed in the name of George E. Kiefer.

The disclosures of the above-noted related Patents are hereby incorporated by reference.

BACKGROUND OF THE INVENTION

This invention relates to the field of electronic control circuits for domestic washing appliances such as dishwashers. More specifically, it relates to control circuits for a dishwashing appliance of the type disclosed in the above-identified related applications in which a microprocessor performs the control functions conventionally performed by a electromechanical sequencer or controller.

In domestic washing appliances such as dishwashers and clothes washing machines, it is desirable to enable the user to manually return the controller to the beginning of the operating cycle at any time in the cycle. In the case of the electromechanical controller, the user merely manually advances the cycle control knob to the start position. However, in the case of a microprocessor based control system, there typically is no control knob to advance. In addition, it is possible that abnormal transient electrical signals applied to the microprocessor may "confuse" the microprocessor during normal microprocessor operation. This condition typically may be corrected merely by resetting the microprocessor. It is desirable therefore to provide a manually operable means by which the operator may reset the microprocessor, thereby interrupting or canceling appliance operation and returning the control program to its starting point. In addition, it is desirable when returning to the starting point in response to a manual reset to remove any water which may have been in the appliance at the time operation was interrupted, as would be the case if a wash or rinse cycle is in progress when the interruption occurs.

It is therefore an object of the present invention to provide a control circuit for a microprocessor controlled washing appliance which enables the user to manually reset the microprocessor.

It is a further object of the present invention to provide a control circuit for a microprocessor controlled washing appliance which enables the user to manually reset the microprocessor and initiate a drain cycle to remove and water from the appliance in response to the manual reset.

It is a further object of the present invention to provide a control circuit for a microprocessor controlled washing appliance which generates a microprocessor reset signal and an initiating signal in response to a manual input, such that the initiating signal is delayed in time relative to the reset signal by a predetermined period.

It is a further object of the present invention to provide a control circuit which performs the above-described functions in time synchronization with the external interrupt timing of the microprocessor.

SUMMARY OF THE INVENTION

The foregoing objects are accomplished according to a preferred form of the present invention by a control circuit which enables the user to manually reset the microprocessor and initiate a drain cycle at any time during appliance operation. This control circuit includes a microprocessor which is programmed to reset its program counter upon receiving a reset signal at its reset port. The reset signal may be generated manually by the user or internally following an interruption in power to the appliance. The reset routine implemented in response to the reset signal includes among its instructions an instruction to scan a microprocessor input port for the presence of an initiating signal. The presence of an initiating signal indicates that the reset was manually initiated by the user input rather than internally initiated and causes the program to branch to a drain subroutine to perform a drain cycle to remove any water from the appliance.

According to an illustrative embodiment of the control circuit of the present invention, a manually operable reset switch is coupled via a network of logic gates to a first latch which in turn is coupled to a seond latch. The output of the first latch is coupled to the microprocessor reset port and the output of the second latch is coupled to a dedicated microprocessor input port. Operation of the latches is synchronized by clock pulses generated by a zero crossing detector which monitors the 60 Hz, 115 AC power line and generates a clock pulse for each zero crossing, the period between pulses defining a control interval. The first latch responds to actuation of the switch by assuming its set output state when clocked by the next occurring clock pulse. The set output state of the first latch defines the reset signal. Thus, actuation of the switch places the microprocessor in its reset state. The microprocessor remains in this reset state until released by the resetting of the first latch which effectively removes the reset signal. The first latch resets in response to deactuation of the switch. The outputs of the first latch are directly coupled to the inputs of the second latch to cause the state of the second latch to follow the state of the first latch delayed in time by a period equal to one control interval. The set output state of the second latch defines the initiating signal which is applied to the dedicated input port of the microprocessor. Since the resetting of the second latch follows the resetting of the first latch, the initiating signal remains at the input port for a period equal to one control interval following removal of the reset signal, thereby assuring that the microprocessor will have adequate time to scan the input port for the presence of the initiating signal during execution of the power up routine which begins upon removal of the reset signal from the reset port. The clock pulses used to clock the latches are also used as external interrupt signals to the microprocessor, thereby synchronizing the reset and initiating signals with the external interrupt signals.

BRIEF DESCRIPTION OF THE DRAWINGS

FIG. 2 is an illustration of a user control panel for operating a dishwasher appliance by means of the present invention.

FIG. 3 is a block diagram indicating the flow paths of data between the inputs and displays of FIG. 2 and the microprocessor.

FIG. 4 is a schematic of an input switch matrix for selecting cycle options.

FIG. 5 is a block diagram of the door interlock system.

FIG. 6 is a block diagram of a DC power supply.

FIG. 7 is a block diagram of the flood detection system.

FIG. 8 is a schematic diagram of the flood detection circuit.

FIG. 12 is a circuit diagram of an illustrative embodiment of the control circuit of the present invention.

FIG. 13 is a block diagram of the computer firmware utilized in conjunction with the microprocessor of FIGS. 1 and 3.

DETAILED DESCRIPTION

Figure 1:
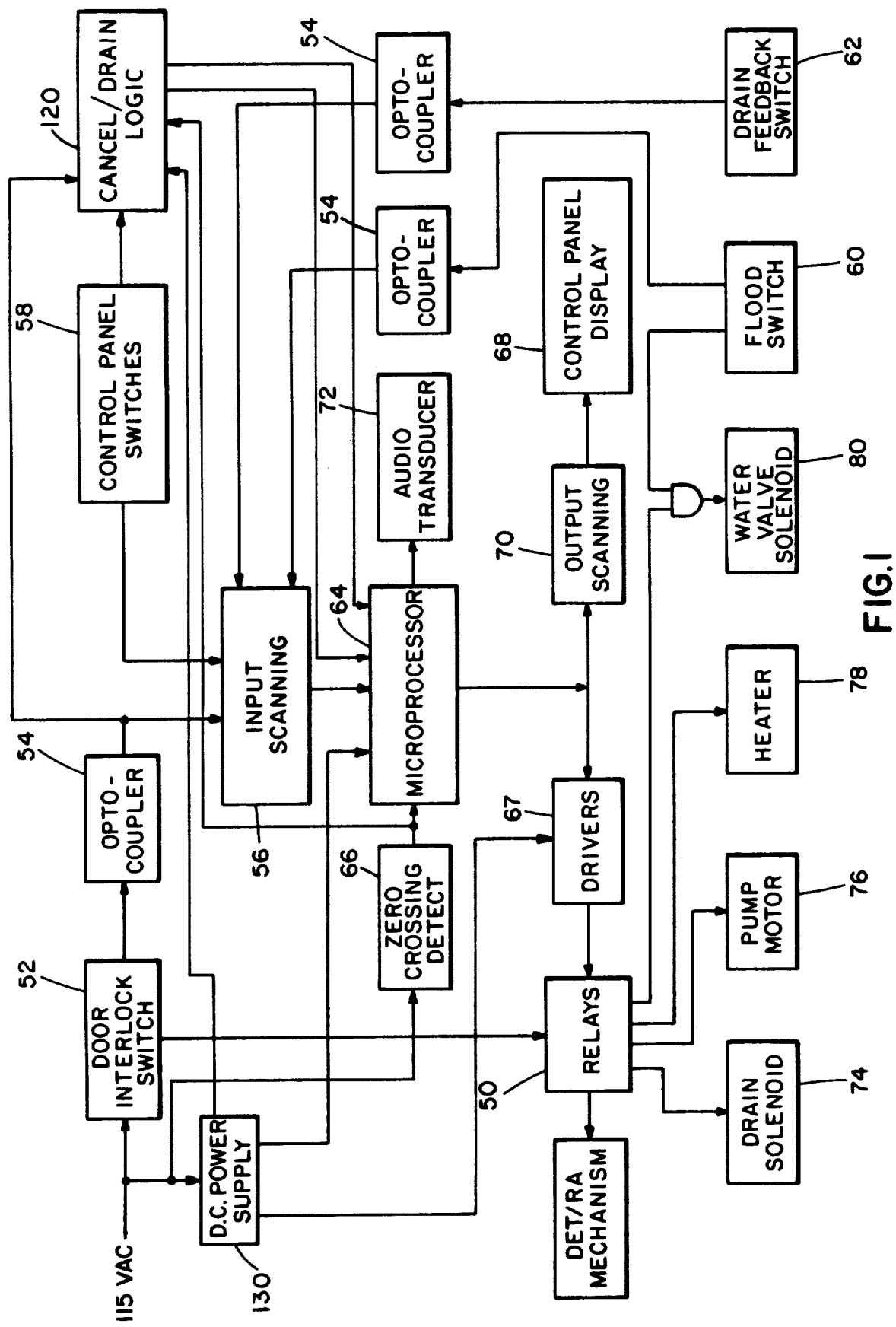
FIG. 1 is a functional block diagram of a microprocessor based control circuit according to the present invention.

Referring now to FIG. 1, a functional block diagram of a control circuit for a microprocessor controlled appliance is illustrated. The control circuit is suitable for consumer appliances, such as dishwashers, clothes washers and similar devices which can be controlled by means of relays to activate motors and solenoids. While the exemplary embodiment to be described in this specification is particularly suitable for a dishwasher, it will be apparent to those skilled in the art that, with slight modifications, it can readily be adapted to clothes washers.

Power to the system is provided from a conventional outlet (115 volt AC source) and is applied to the relays 50 through a door interlock switch 52. The power is also applied to a DC power supply circuit 130, illustrated in FIG. 6, to generate the various DC voltages required by the microprocessor and the associated logic circuitry. The door switch is connected via an optocoupler 54 to an input scanning matrix 56. Additional inputs to the matrix 56 include: control panel switches 58 by which the machine user selects the desired cycle operations; flood switch 60; and drain feedback switch 62. Alternately, the door, flood and drain switches may bypass the input scanning network 56, discussed in connection with FIG. 4, and be provided to appropriate input ports of the microprocessor 64.

In either case the five sources of inputs which are monitored by the microprocessor may be summarized as: inputs from the control panel 58, including cancel or reset button 100 (FIG. 2), the door interlock 52, the flood switch 60, the drain feedback 62, and a zero crossing detector 66 used for generating external interrupts in the microprocessor and synchronizing logic circuit operation. Responsive to these inputs and based on the control program stored in the microprocessor, three types of output funcitons are performed. The microprocessor provides power control by activating selected ones of the relays 50 through relay drivers 67; it updates a control panel display 68 via an output scanning matrix 70; and it drives an audio transducer 72 (FIG. 1) to provide audio feedback during cycle selection by the user. In addition, the microprocessor interrupts appliance operation and resets in response to actuation of switch S12 (FIG. 3) via cancel button 100.

In the case of a dishwasher embodiment, the relays 50 controlled by the microprocessor close circuits to a drain solenoid 74, a pump motor 76, heater 78, and a water valve solenoid 80, each relay in set 50 being uniquely associated with one of these circuits. As indicated in FIG. 1, the water solenoid is logically ANDED with the flood switch 60 such that, if overfill is detected, the water valve is immediately de-energized.

The optocouplers 54 utilized for connecting door, flood and drain feedback switches to the input scanning matrix 56 or, alternatively, directly to the microprocessor, serve as isolating elements in a manner well known in the art. Such elements are commercially available and, for example, the following component may be utilized: G.E. H11AA2.

The microprocessor 64 may similarly be a commercially available product and, for purposes of illustrating a dishwasher embodiment of the invention, the description will be based upon the use of a single chip 3870 microprocessor manufactured by Mostek or Motorola. The following technical literature is available regarding the 3870 microprocessor and is hereby incorporated by reference: Mostek F8 (Microprocessor Devices Single Chip Microprocessor Computer MK3870, July 1977. The device is an eight bit microprocessor containing approximately a 2K read only memory (ROM), a small random access memory, and four bi-directional I/O ports. The chip includes four ROM address registers which serve as the program counter, stack registers, data counter, and auxiliary data counter. The firmware program provided in the 2K on board ROM is described in connection with FIGS. 13 through 21B.

Control Panel

Referring now to FIG. 2, a user control panel is illustrated containing the control panel switches and displays by which the user can interface with the control circuit and the controlled appliance. The control panel switches are illustrated in FIG. 2 as a plurality of membrane touch switches 90. When touched, a circuit is created producing a signal to the microprocessor. In this manner the user can select one of a variety of washing cycles of the usual type offered as, for example, normal wash, short wash, rinse and hold. In addition, the water level can be selected as can the use of heated or ambient air drying. Located adjacent each membrane switch is a light emitting diode (LED) 92. When a membrane switch has been touched and the input received and accepted by the microprocessor, an output is produced illuminating the appropriate LED 92 to confirm to the user that the control circuit has accepted a desired cycle option.

The control panel also contains a two digit seven segment display 94 and three additional LEDs 96 which indicate the current portion or progress in the cycle being executed, i.e., washing, rinsing, and drying. The seven segment display is updated by the microprocessor and always displays either the time to the end of the cycle or one of the diagnostic codes to be described. Start and cancel buttons 98 and 100 initiate operation of the appliance or interrupt operation, respectively, and these buttons, as with switches 90, communicate with the microprocessor through the matrix illustrated in FIG. 4.

In an effort to encourage the user to select cycle options which are energy efficient, the panel is provided with a visual energy monitor 102 comprising a set of LEDs arranged in a horizontal row. Based on the options selected, the microprocessor determines and illuminates the appropriate number of LEDs that will be lit, the greater the relative energy consumed the greater the number of illuminated LEDs.

Control-Panel-Communications

FIG. 3 is a block diagram similar to FIG. 1 providing details with respect to the data paths to and from the microprocessor and the various peripheral devices. A control circuit in accordance with the present invention is illustrated functionally as switch S12 actuated by cancel button 100 (FIG. 2) in combination with cancel/-drain logic 120, to be described in detail with reference to FIG. 12. As illustrated in FIG. 4, the membrane multiplexed switches on the control panel are connected in a switch matrix for communication with the microprocessor. The matrix includes six rows labelled SW0 through SW5 and three columns labelled SE0 through SE2. Each membrane switch 90 on the control panel, with the exception of cancel switch 100, is connected across a row and column of switch matrix 110 to define a unique digital code combination. Each switch corresponds to a different selectable option as, for example, switch S3 is the normal wash switch while switch S4 is the heated dry switch. If switch S3 is pressed, a circuit is completed connecting row SW1 to column SE0, which circuit produces the digital code detected by the microprocessor. A similar statement is true with respect to each of the remaining switches 110 except for switch S12 which is the cancel switch. Switches S13 and S14 are utilized by service personnel to initiate the operation of a test cycle contained in the microprocessor ROM.

Each row of the matrix 110 is connected as an input to the microprocessor 64. The three columns are outputs from the microprocessor applied to the matrix via a BCD to decimal decoder 112. These column outputs are also provided to a column driver 114 used to drive the LED display 116 on the control panel. Similarly, the microprocessor outputs eight row lines through a row driver 118 to complete a circuit to the LED display.

As previously indicated, the cancel switch S12 is actuated by cancel button 100 on the control panel, but is not part of the membrane switch matrix. In accordance with the present invention, switch S12 is connected between a source of DC voltage and cancel/reset logic 120. When the cancel switch is closed an external reset of the microprocessor is performed causing interruption of the cycle in process, resetting of the microprocessor and initiation of the cancel-drain routine for draining water in the appliance.

The microprocessor is also reset by an internally generated reset signal each time power is applied to the unit in a conventional manner. The internally initiated reset signal is provided by a power supply monitoring circuit represented as Block 122 in FIG. 3. This circuit can be one of a conventional and well known class of circuits which generate a logic signal in response to changes in the output voltage of the power supply. In the illustrative embodiment, circuit 122 monitors the DC voltage output of Block 143 of FIG. 6, designated $V_B$. When power from the power line is initially applied to the appliance or restored following a service interruption, circuit 122 provides an output signal which is active high, i.e., logical one when $V_B$ exceeds a first threshold, nominally 3 volts, and remains active high until $V_B$ exceeds a second threshold, nominally 9 volts. This signal is inverted and applied to the reset port of microprocessor 64. Thus, when power is applied or restored, a signal is automatically provided to the microprocessor by circuit 122 which places the microprocessor in its reset state.

Door Interlock System

Referring to FIG. 5, the pertinent portions of the FIG. 1 block diagram are reproduced which relate to the door interlock system. The line voltage is applied to the door interlock switch 52 and to the power supply 130 described in connection with FIG. 6. A mechanical latch 132 controls operation of switch 52 such that when the dishwasher door is open, power is removed from the output contacts of relays 50. By means of an optocoupler 54 the door switch status is communicated to the microprocessor 64 which then deenergizes the coils of the relays.

It should be noted that power supply 130 is not connected through the door switch and thus the microprocessor always receives power regardless of the state of switch 52 and constantly monitors the condition of the appliance whether or not it is operating. This facility permits the detection of an overfill condition which might occur while the machine is not in operation by virtue of a faulty water valve. In such a case, a flood control cycle would be automatically initiated. When the door switch is closed, power is applied to the relays permitting their selective actuation by the microprocessor through drivers 67.

Power Supply

FIG. 6 illustrates the power supply 130 which is conventional in nature and will be only briefly described. A transformer 140 provides outputs to bridge rectifiers 142 and 144, and center tap rectifier 143. Rectifier 142 produces a 24 volt DC power output for driving the relay coils. Rectifier 143 provides an output to a three terminal regulator 145 producing a five volt DC power supply for the microprocessor and associated logic circuitry. Rectifier 144 produces 24 volts DC for the timing circuit 56.

Flood Control System

Referring to FIGS. 7 and 8, the flood control (or overfill) system for the appliance incorporating the illustrative embodiment of the control circuit of the present invention is illustrated. FIG. 7 is a reproduction of the appropriate blocks of FIG. 1 relating to the flood contro while FIG. 8 is a schematic of the flood feedback circuit. The flood switch 60 is controlled by a float 150 customarily located within the washing tub at a level so that excess water in the tub will cause the float to rise and open the flood switch connected thereto. The flood switch is connected in series with the water solenoid 80 in a normally closed configuration. When the flood switch opens it interrupts the circuit path from the associated relay 50 to the water solenoid 80 and immediately shuts off the water supply to the appliance. This function is indicated in FIG. 7 as AND gate 152. When switch 60 opens it provides an input via the optoisolator 54 to the microprocessor either through the input matrix 56 or, as illustrated in FIG. 7, directly to the microprocessor through an available I/O port. The microprocessor, upon detecting the overfill or flood condition, executes a flood control routine described in connection with FIG. 21. In general, the flood control routine discontinues normal operation of the appliance and initiates a drain cycle which persists until flood switch 60 returns to its normally closed position indicating a safe water level in the appliance.

Drain Feedback System

Figures 9, 10:
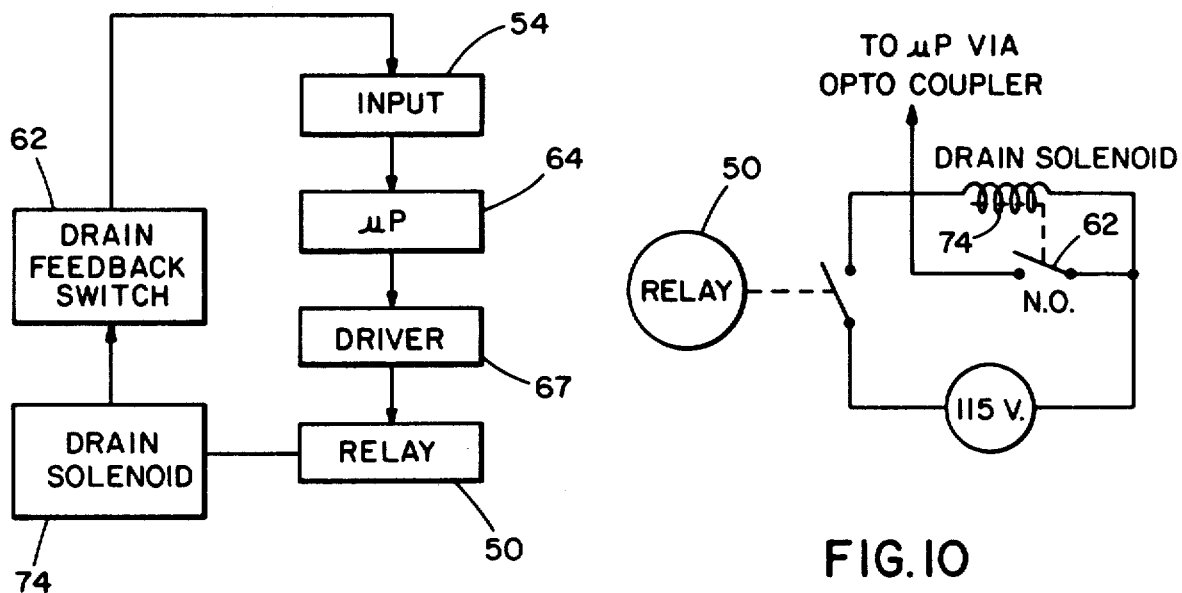
FIG. 9 is a block diagram of the drain feedback system.
FIG. 10 is a schematic of the drain feedback circuit.
Figure 11:
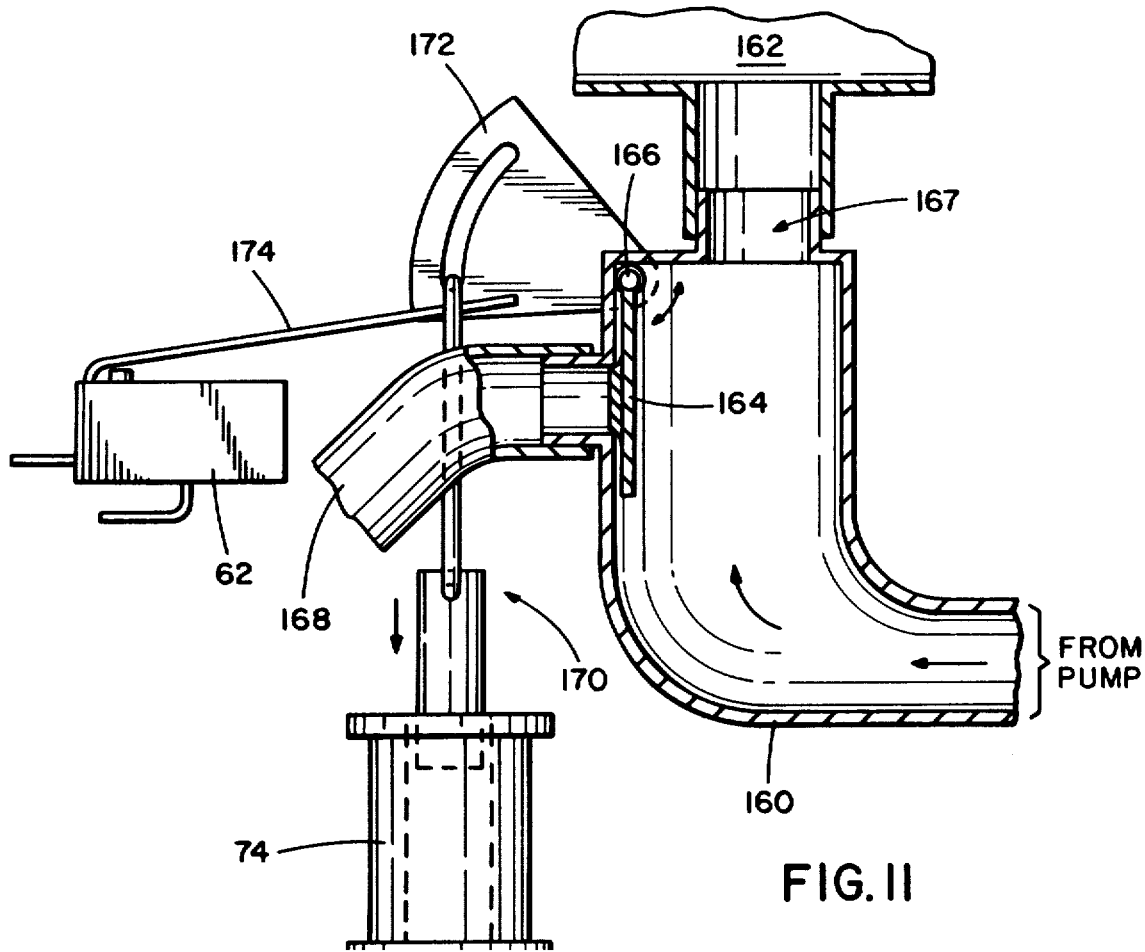
FIG. 11 is a sectional view through the drain system of a dishwasher illustrating the details thereof.

FIGS. 9 and 10 illustrate the operation of the drain feedback system which serves to permit the microprocessor to accurately monitor the operation and condition of the drain system. The drain solenoid 74 is actuated by the associated relay 50 in order to initiate draining of water from the appliance. The mechanical arrangement of the drain system is illustrated in FIG. 11. When the solenoid is operated, the drain feedback switch 61 is closed thereby providing an input to the microprocessor 64 via optoisolator 54. The feedback switch is periodically polled during the course of the drain cycle. The drain diverter valve, the linkage of which controls actuation of the drain switch, is mechanically arranged to permit the switch to open when water has been pumped out of the appliance. Thus, during normal operation, the drain feedback switch 62 should, initially, be closed when the solenoid is actuated and subsequently, within predictable time limits, the switch should open indicating completion of the drain cycle. If the switch fails to go on at the beginning of a drain cycle, the microprocessor identifies a drain system failure (DS). If the switch closed longer than normal for a specified quantity of water, the microprocessor identifies a long drain situation (LD) indicative of partial drain blockage or other service problem. Similarly, if the switch stays closed for an unlimited period of time the microprocessor identifies a plugged drain (PD) situation and terminates operation of the appliance to prevent flooding. This operation is detailed in connection with FIGS. 17 and 17A.

FIG. 10 illustrates the schematic arrangement of the drain feedback circuit indicating the mechanical ganging of the feedback switch 62 to the drain solenoid 74 via the drain diverter valve to be described.

Drain Feedback Mechanical Design

Referring to FIG. 11, a suitable drain system mechanism for use with the present invention is illustrated. This mechanical design is intended for a dishwasher appliance and in some respects is conventional. It will be recognized that other drain arrangements are possible as long as the drain feedback switch 62 is positioned to detect operation of the drain diverter valve.

In the usual dishwasher construction the pump housing defines a water flow path from a pump (not shown) upwardly through a channel 160 into the tub of the appliance indicated at 162. In this manner water is forced into the appliance for washing and rinsing purposes. Water is withdrawn from the tub through openings (not shown) to complete the circuit whereby steady water circulation is obtained. When it is desired to discharge the water from the appliance, a diverter valve 164, which is hingedly attached to the housing at point 166, is positioned across the opening 167 to divert water from the tub into a drain line 168. Except when draining, the diverter seals the drain line 168 to prevent water from leaking out of the appliance.

Once the diverter valve has been moved to a horizontal position across the opening 167 the pressure of the water against the valve will maintain it in place without energization of the solenoid until substantially all of the water has been discharged into the drain line. At that point the valve should automatically return to the FIG. 11 position resealing the drain line and permitting circulation between the pump and the appliance tub.

The diverter valve is controlled by the drain solenoid 74 to which it is connected by an armature assembly 170 and a linkage 172. As will be apparent, when the solenoid is energized the armature retracts into the solenoid rotating the linkage in the direction indicated by the arrow thus moving the diverter valve to its horizontal position.

According to one embodiment of the invention, the feedback switch 62 includes a finger 174 positioned in the path of the armature assembly whereby downward rotation of the assembly closes the switch and upward rotation opens the switch. The condition of the switch is monitored by the microprocessor in the manner described in connection with FIGS. 9 and 10. Based upon the state of the switch and the time elapsed from the beginning of the drain cycle, the microprocessor is programmed to detect drain system failures of the type previously indicated and, if necessary, to abort cycle operation to prevent flooding.

Cancel-Drain Logic

FIG. 12 shows schematically an illustrative embodiment of the control circuit of the present invention which is represented in FIGS. 1 and 3 as Cancel/Drain Logic Block 120 in combination with switch S12. The purpose of the cancel-drain logic is to enable manual reset of the microprocessor by the user. In serving this purpose, the circuit performs two functions. First, it interrupts any appliance cycle in progress by providing a reset signal to the reset port of the microprocessor, resetting the microprocessor. Second, it provides an input or initiating signal to a dedicated I/O port of the microprocessor to initiate a drain cycle to remove any water from the appliance before permitting further user operation. The circuit of FIG. 12 accomplishes this by means of logic circuitry coupling manually operable switch S12 to the reset port and a dedicated I/O port of microprocessor 64 (FIG. 3). The particular I/O identified in FIG. 3 is dedicated to receiving an input or initiating signal. The microprocessor is programmed to initiate a drain cycle following reset upon detection of an initiating signal at this dedicated I/O port.

Before describing the circuit of FIG. 12 in detail, certain aspects of the programming of the microprocessor with which it interfaces will be briefly described.

Figure 13A:
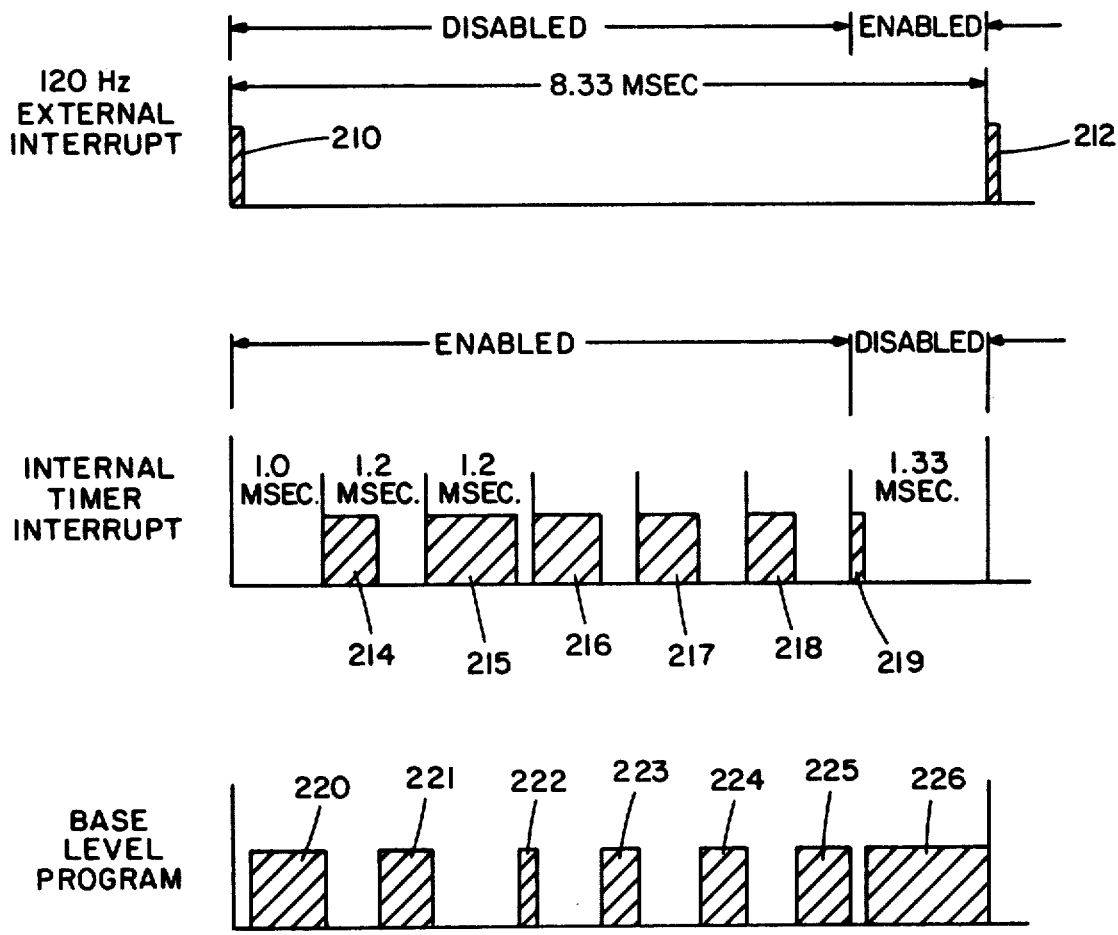
FIG. 13A is a timing diagram illustrating the processing sequence for the operation of the microprocessor of FIGS. 1 and 3.
Figure 14:
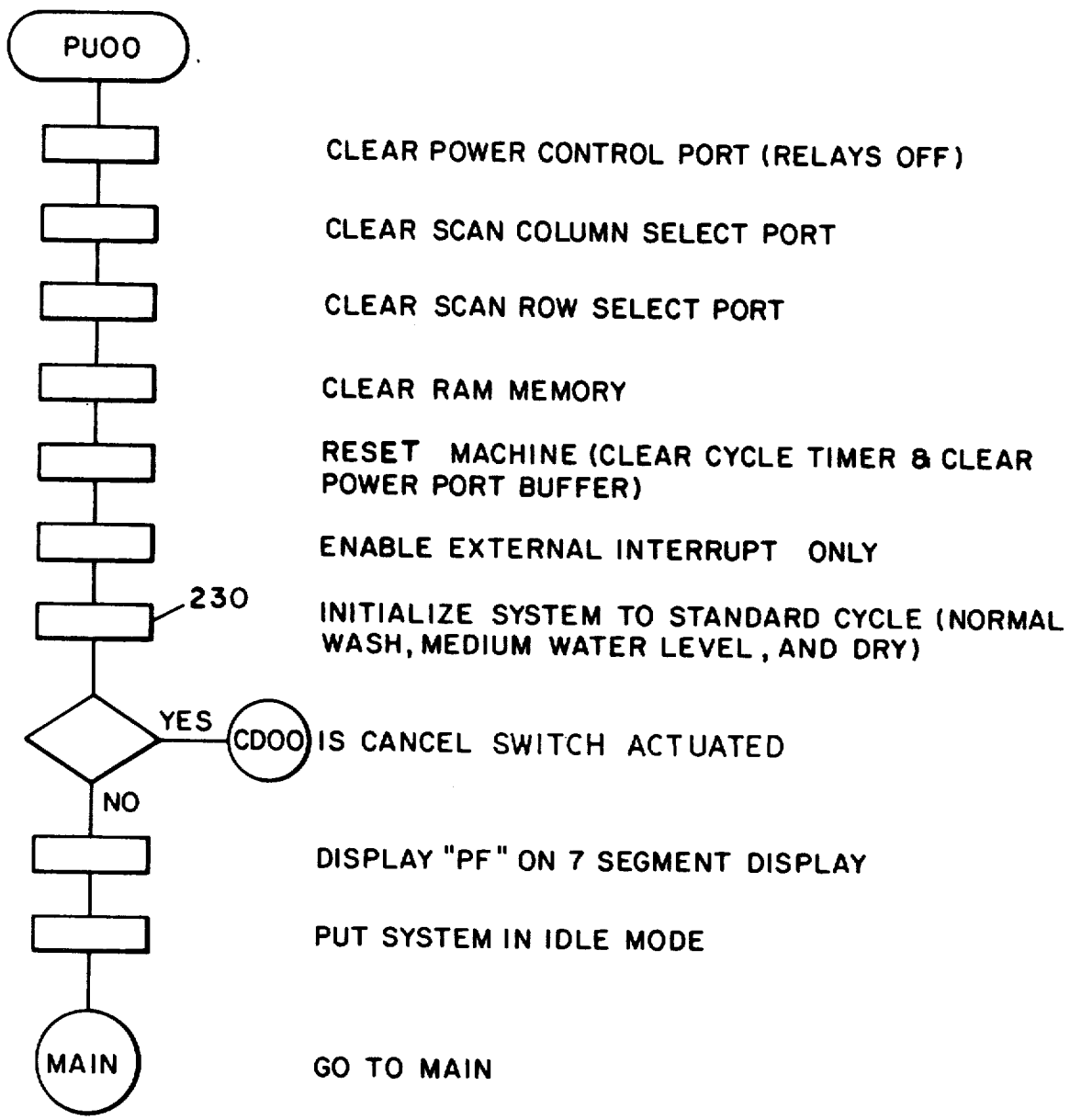
FIG. 14 is a flow diagram depicting the Power Up Routine of the microprocessor of FIG. 1.

As illustrated in FIGS. 13 and 14, microprocessor 64 (FIG. 3) includes in its read only memory (ROM) a power up routine 196 (FIG. 13). Programming of the microprocessor is such that the program counter is reset to a predetermined reset position, a zero address position, whenever a reset signal is detected at the microprocessor reset port. When in a reset state, the microprocessor is idle, and the program counter remains at the reset position. The microprocessor remains in the reset state until the reset signal at the reset port is removed. Removal of the reset signal from the reset port releases the program counter enabling the microprocessor to step through the power to routine illustrated in the flow chart of FIG. 14 which begins at the zero address in the ROM.

It will be recalled that the illustrative embodiment includes, in addition to the manual reset, means for internally initiating a reset when the power is initially applied to the appliance following an interruption in power. When the reset is internally generated, it is desirable not to perform the drain cycle as part of the reset. The microprocessor distinguishes between the manual reset and the internally generated reset by scanning a dedicated I/O port during the power up routine. The presence of an initiating signal at this I/O port following reset identifies the reset as a manually initiated reset. Detection of this signal when scanning during execution of the power up routine causes the microprocessor to branch to the cancel/drain routine illustrated in the flow chart of FIG. 17 which implements a drain cycle. If no signal is detected at the I/O port, there is no branch to the cancel/drain routine and a drain cycle is not implemented.

In order to insure detection the initiating signal provided to the I/O port in response to a manual reset must remain active for a finite period of time following removal of the reset signal from the reset port since execution of the reset routine does not begin until the reset signal is removed. This period of time must be sufficient to allow the microprocessor to perform the scanning instructions before the initiating signal is removed from the I/O port. Thus, a control circuit is needed which responds to a manual input by generating a reset signal and an initiating signal in such a manner that the initiating signal remains for a predetermined period of time following removal of the reset signal.

The control circuit of the present invention meets these requirements by providing a manually operable switch, switchable between an actuated state and a deactuated state, a reset signal means having an input coupled to the switch and an output coupled to the reset port of the microprocessor for providing a reset signal to the microprocessor reset port in response to actuation of the switch and removing the reset signal in response to deactuation of the switch; and initiating signal means coupled at its input to the reset signal means and coupled at its output to an input port of the microprocessor for providing in response to the reset signal an initiating signal to the input port which remains at the input port for a predetermined period of time following removal of the reset signal from the reset port; together with a microprocessor which is constructed and arranged to interrupt appliance operation and reset in response to a reset signal from the reset signal means applied to its reset port and upon removal of this reset signal to execute a power up routine during which the input port is scanned for the presence of an initiating signal from the initiating signal means and upon detection of the initiating signal to initiate a predetermined operating cycle, preferably a drain cycle.

Referring to the illustrative embodiment of the control circuit of this invention in FIG. 12, the manually operable switch is a conventional two-position pushbutton switch S12 having a closed, actuated state and an open, deactuated state. The pushbutton is biased to its open position. When S12 is closed a positive high logic level voltage corresponding to a logical one state appears at terminal S12(b). When S12 is open terminal S12(b) is at ground potential corresponding to a logical zero state.

Reset signal means is provided in the form of latch 184, which may be a conventional J-K type bistable flipflop. The set or J input of latch 184 is coupled to terminal S12(b) via logical inverter 180 and logical NOR gate 181. Actuation of switch S12 causes a logical one signal to appear at the input to inverter 180. This signal is inverted to a logical zero signal by inverter 180 and applied to the input of 181 causing a logical one signal to appear at the output of gate 181. The logical one signal at the output of gate 181 is applied to the J input of latch 184 enabling latch 184 to assume its set output state, which is defined to be a logical one signal at the Q output of latch 184 designated Q1. The next occurring clock pulse applied to the clock input CLK of latch 184 is effective to switch Q1 to a logical one state thereby placing latch 184 in its set state. Clock pulses are provided by clock pulse-generating means in the form of zero crossing detector circuit 66.

The Q output of latch 184 is coupkled to the reset port of microprocessor 64 (FIG. 3) via NOR gate 183. A Q1 signal equal to a logical one causes the output signal of gate 183, which is applied to the reset port 65, to go to a logical zero. This logical zero signal at the reset port is effective to reset the microprocessor. The microprocessor remains in a reset state as long as the signal of the reset port is low, that is, as long as latch 184 remains in its set output state. Latch 184 will remain in the set output state until switch S12 is opened or deactivated, which causes the signal at terminal S12(b) to switch to a logical zero state. This signal is NORed by gate 182 with the Q output of latch 186 which is a logical zero state (to be explained hereinafter) causing the output of gate 182 to switch to a logical one state. The logical one signal of the output of gate 182 is applied to the reset or K input of latch 184 enabling latch 184 to assume its reset output state (Q1 equals a logical zero). The next occurring clock pulse following deactuation of switch S12 is effective to place latch 184 in its reset output state. The resetting of latch 184 effectively removes the reset signal from the reset port. When latch 184 switches to its reset output state (in the absence of an internal reset signal from power up monitor 122) the output of gate 183 applied to the reset port switches to a logical one thereby releasing the microprocessor from its reset state in response to deactuation of the switch.

Initiating signal means is provided in the illustrative embodiment in the form of latch 186, a conventional J-K type bistable flipflop. The set or J input of latch 186 is coupled directly to the Q output Q1 of latch 184. A Q1 equal to a logical one enables latch 186 to assume its set output state (Q2 equal a logical one), and the next occurring clock pulse following the switching of Q1 to logical one is effective to switch Q2 to a logical one. The Q output of latch 186 is coupled to a particular I/O port of microprocessor 64 dedicated in this embodiment to function as an input port which is scanned for the presence of an initiating signal during execution of the microprocessor power up routine implemented immediately following microprocessor reset. The set output state of latch 186 (Q2 equal logical one) defines the initiating signal. The reset or K input of latch 186 is coupled directly to the $\overline{Q}$ output of latch 184. $\overline{Q1}$ equal to a logical one, corresponding to a reset output state for latch 184, enables latch 186 to assume its reset output state (Q2 equal to logical zero). The first clock pulse succeeding the reset of latch 184 is effective to switch latch 186 to its reset output state. The clock pulse which switches latch 186 to its reset output state is the pulse succeeding the pulse which switched latch 184 to its reset output state. Consequently, latch 186 remains in its set output state for a predetermined period of time equal to one control interval (the period between clock pulses) following the resetting of latch 184. Thus, latch 186 causes the initiating signal to remain at the microprocessor input port for a period of time equal to one control interval following removal of the reset signal from the reset port. This insures that the microprocessor will have sufficient time to detect the initiating signal during execution of the power up routine.

Latches 184 and 186 employed in the illustrative embodiment may be of the type readily available commercially as a pair in an integrated circuit made by Texas Instruments and others identified by the Serial Number 74LS114.

The logic circuit is energized by the regualted 5 volt d.c. output from the d.c. power supply 130 (FIG. 1) more specifically, the three terminal regulator 145 (FIG. 6). Resistor R1, nominally 100 ohms, is serially connected between the voltage input terminal and switch terminal S12. Resistor R2, nominally 220 ohms, is serially connected between switch terminal S12 and ground. The logical one signal level is then approximately 3.4 volts with logical zero being zero volts. In addition to functioning as a voltage divider, resistor R3 also provides a discharge path for filter capacitor C connected in parallel with R2. Capacitor C may be nominally 0.1 uf.

Zero crossing detector circuit 66 may be one of several circuits well known in the art for detecting zero crossings of an ac signal and generating a clock pulse marking the occurrence of each zero crossing of the signal. Circuit 66 monitors the 115 volt, 60 Hz, ac power signal from the power line and generates clock pulses at a rate of 120 latches 184 and 186 and also to an I/O port of the microprocessor dedicated to detecting external interrupt signals. The clock pulse defines the external interrupt signal. The response of the microprocessor to the external interrupt signals is described herein with reference to the external interrupt routine illustrated in FIG. 18. This common use of the clock pulse signal time synchronizes the operation of latches 184 and 186 with the external interrupt signals applied to the microprocessor. This synchronization is important in that it prevents the external interrupt signal from interrupting the Power Up routine which always follows reset. Since the external interrupt causes the microprocessor to jump to another part of the program, reading the initiating signal before latch 186 resets is more difficult if the Power Up routine can be interrupted before scanning the dedicated I/O port for the intitiating signal. Synchronization of the reset and initiating signals with the external interrupt signal insures that such interruptions will not occur.

Power up Monitor circuit 122 described hereinbefore with reference to FIG. 3 generates a logical one signal upon detection of the output of the d.c. power supply rising from zero to operating level. This output is coupled to the microprocessor reset port via gate 183 and to the clear inputs CLR of latches 184 and 186 via logical NOR gate 187. Thus, in response to the power up of the d.c. power supply, an internal reset signal is generated which resets the microprocessor and clears the latches. It should be noted that no initiating signal is generated in response to the internally generated reset signal. Thus, although the signal at the reset port appears the same to the microprocessor the manual reset is distinguished from the internal reset by the presence of the initiating signal at the input port.

Logical NOR gate 187 also couples a signal representing the state of the door interlock switch 52 (FIG. 5) to CLR inputs at latches 184 and 186 to clear these latches when the output of optocoupler 54 is a logical one, indicating that the dishwasher door has been unlatched. Thus, the unlatching of the door generates a holding signal which holds the latches cleared until the door is relatched thereby preventing the initiation of a cancel/drain operation while the door is unlatched.

Figure 12A:
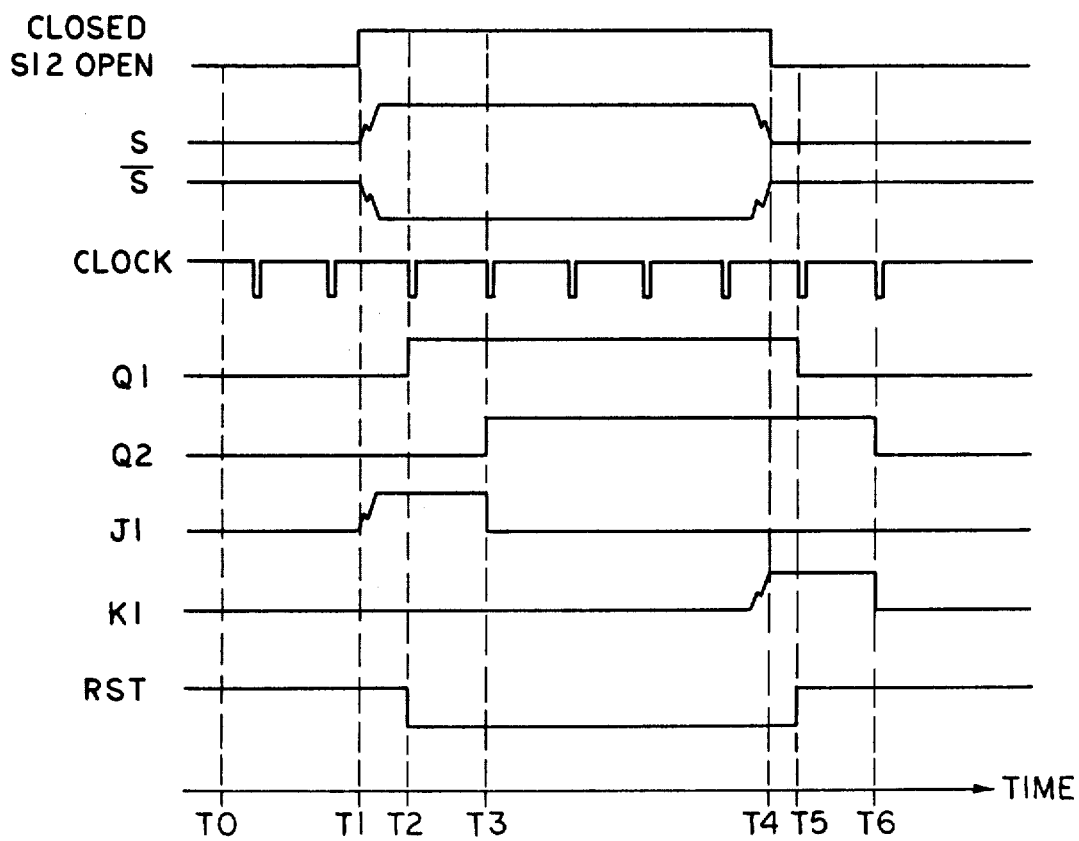
FIG. 12A is a timing diagram illustrating the time relationship of various logic signals in the control circuit of FIG. 12.

Operation of the circuit will be described with reference to the timing diagram of FIG. 12A, in which S12 represents the state of switch S12; S represents the signal at switch terminal S12(b); $\overline{S}$ represents the output of inverter 180; CLOCK represents the clock pulses from circuit 66; Q1 represents the output signal at Q of latch 184; Q2 represents the output signal at Q of latch 186. J1 and K1 represent the output of gates 181 and 182, respectively, which are applied to the J and K inputs, respectively of latch 184; and RST represents the output signal of gate 183 which is applied to the microprocessor reset port.

At time To, the circuit is in a normal or rest state. Switch S12 is open and latches 184 and 186 are in their reset output states, (Q1 and Q2 equal to logical zero). The user desiring to cancel appliance operation closes switch S12 at time T1 causing S, $\overline{S}$ and J1 to change states. J1 changes to a logical one state enabling latch 184 to switch to its set output state upon the occurrence of the next clock pulse following the closing of S12 which occurs at T2. At T2, Q1 switches to a logical one causing RST to switch to a logical zero thereby placing the microprocessor in its reset state. In addition, Q1 equal to a logical one enables latch 186 to switch to its set output state upon the occurrence of the next clock pulse at T3. At T3, Q2 switches to a logical one providing the initiating signal to the dedicated microproscessor I/O port and causing J1 to switch to a logical zero.

The circuit remains in this active state until switch S12 is opened by user release of the cancel pushbutton at T4 causing S to switch to a logical zero and K1 to a logical one. The logical one at K1 and logical zero at J1 enable latch 184 to switch to its reset output state upon the occurrence of the next occurring clock pulse following opening of the switch which occurs at T5. At T5 Q1 switches to a logical zero and consequently RST switches to a logical one thereby removing the reset signal from the reset port and releasing the microprocessor from the reset state.

The application at T5 of Q1 equal to logical zero and $\overline{Q1}$ equal to logical one to the J and K inputs, respectively, of latch 186, enable latch 186 to switch to its reset output state upon the occurrence of the next clock pulse at T6. At T6, Q2 switches to a logical zero thereby removing the initiating signal from the input port. $\overline{Q2}$ switches to a logical one causing K1 to switch to a logical zero. Thus, at T6 the circuit its reutrned to its initial state.

It is clear from the timing diagram that the response of latch 186 follows the response of latch 184 after a time delay equal to one control interval. Consequently, the initiating signal defined as Q2 equal to a logical one, remains at the microprocessor input port for a predetermined period of time equal to one control interval after the effective removal of the reset signal (corresponding to Q1 equal logical one) from the reset port.

Thus, the illustrative embodiment of the present invention shown in FIG. 12 provides a reset signal in response to manual actuation of a switch which interrupts appliance operation by resetting the microprocessor and which also provides an intiating signal which remains at the appropriate microprocessor I/O port for a sufficient period of time following removal of the reset signal to enable the microprocessor to detect the signal during execution of its power up routine following reset.

The synchronous latches, clocked be pulses from the zero crossing detector provide clear, well-defined signals to the microprocessor, thereby eliminating potential problems due to contact bounce in opening and closing switch S12, and simplifying microprocessor programming.

Firmware Structure

As indicated hereinbefore, the microprocessor utilized with the control circuit of the present invention is in a single chip device including an on board ROM in which the control program is permanently installed prior to shipment of the appliance to the user. To insure that a complete disclosure of the invention is given, there follows a detailed description of the firmware structure employed and a discussion of the flow diagrams relating to each program routine used to implement an operative device in accordance with the present invention. Based on the following disclosure, the development of specific program statements from the flow chart, is a routine matter dependent upon the particular microprocessor selected, its corresponding instruction set, and the desires of the designe in selecting the type of user selectable options which will be incorporated into the firmware.

Referring now to FIG. 13, the general arrangement of the firmware is illustrated. It consists of a base level program 190 subject to interruption by external interrupt routine 192 and internal interrupt routine 194. Additionally, upon reset of the microprocessor, a power up reset routine 196 is performed prior to entry into the base level control program. The base level program includes a number of software routines including the cancel-drain routine 198, a main routine 200, execution routine 202, and cycle interruption routine 204. The latter routine may be further divided into a door monitor routine 206 and a flood control routine 208. Each of the indicated routines will now be identified and briefly described in connection with the corresponding figure.

Turning to FIG. 13A, a system timing diagram is illustrated which indicates the interrelationship between standard line voltage, the interrupts and the base level program. U.S. line voltage has a frequency of 60 hertz, and thus a zero crossing will occur every 8.33 milliseconds. Each zero crossing produces an external interrupt, as indicated at 210 and 212. As will be described in connection with the interrupt program routines, every time an external interrupt occurs further external interrupts are prevented by disabling the external interrupt port of the microprocessor. This prevents extraneous noise on the power line from causing improper operation of the control circuit. Thus, after an external interrupt occurs, external interrupts are disabled for a substantial portion of the 8.33 millisecond interval.

During the period when external interrupts are disabled, internal interrupts generated within the microprocessor are enabled and indicated at 214 through 219. As will be described in connection with the internal interrupt routine, each of these internal interrupts are utilized for various purposes, such as updating the display and inputting option information. The final internal interrupt is effective for disabling further internal interrupts nd re-enabling external interrupts in preparation for the next cycle.

In the time windows between internal interrupts the base level program 190 is performed by the microprocessor as well as during the period after the last internal interrupt but before the occurrence of the next external interrupt. Thus, base level execution occurs at points 220 through 226 indicated.

Power Up Routine

Figure 20:
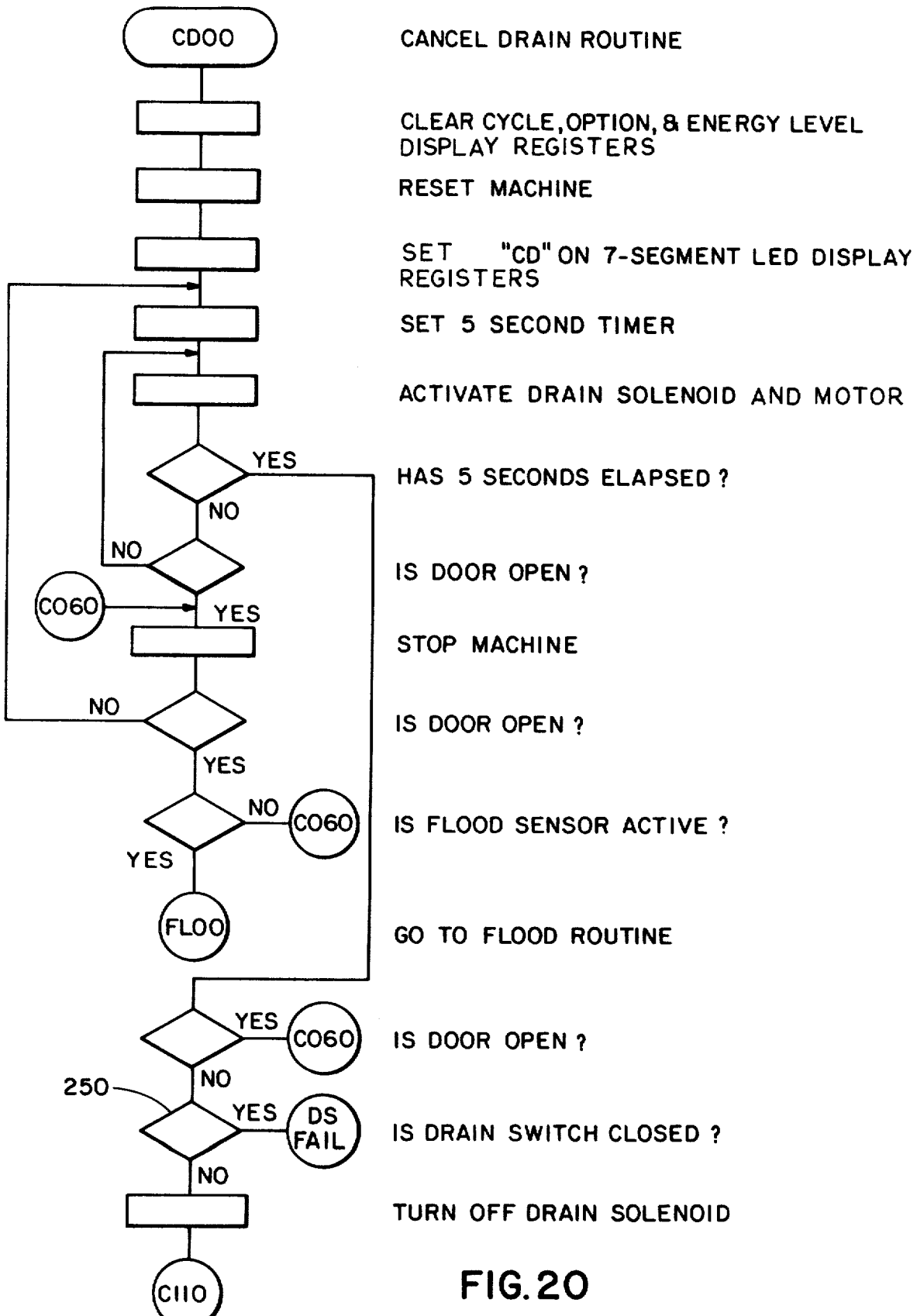
FIGS. 20 and 20A are flow diagrams depicting the Cancel Drain Routine of the microprocessor of FIG. 1.
Figure 20A:
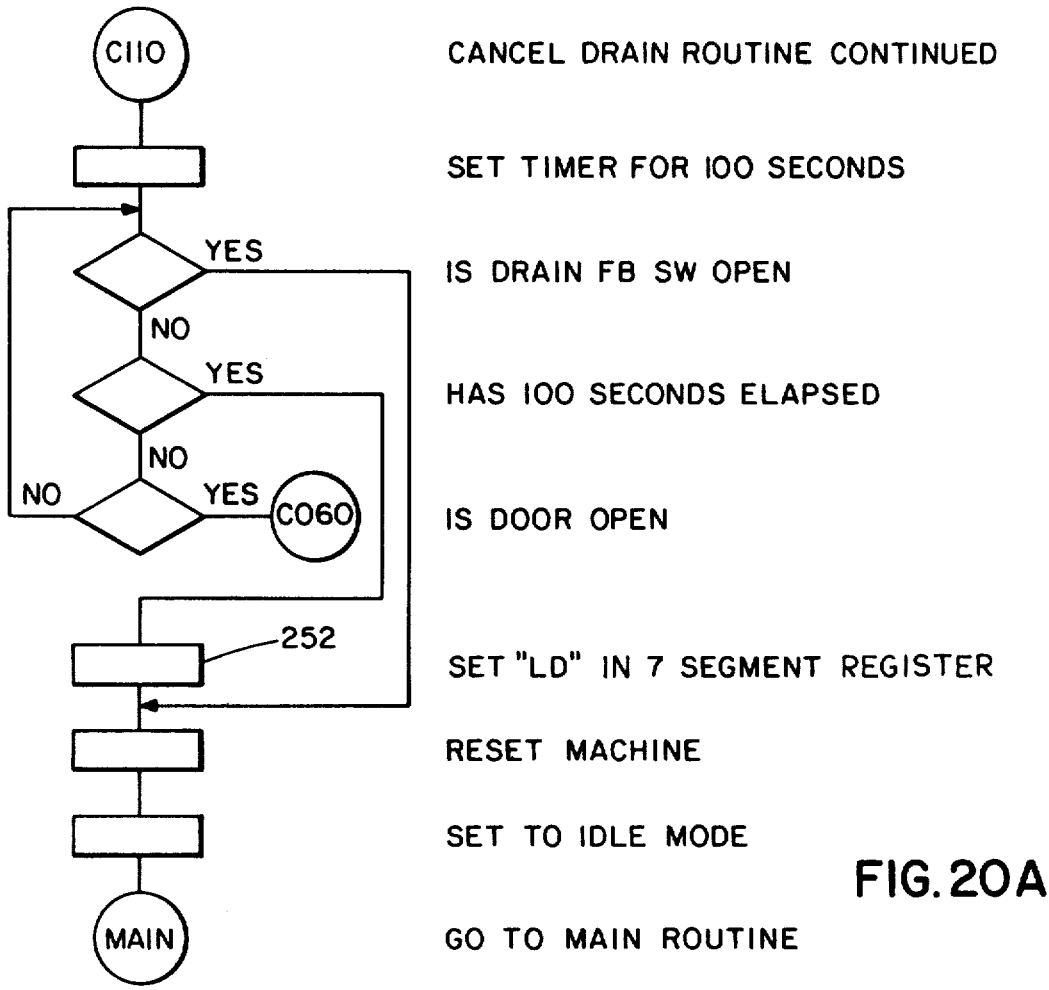

FIG. 14 discloses the flow diagram for the power up routine which is executed following removal of the reset signal from the microprocessor reset port. The on board ROM contains instructions for effecting the logical steps indicated in FIG. 14 each time power is applied to the control circuit or a reset is desired. Summarizing the steps illustrated in FIG. 14, first the relays are turned off, the scan ports are cleared, the ram is cleared, the program timers and power control registers are initialized, and then the external interrupt is enabled. If desired, as indicated by box 230, the system may be initialized to a standard cycle as, for example, normal wash, medium water with drying. The program then checks the dedicated I/O port discussed in connection with FIG. 12 to see if switch S12 (FIG. 4) has been actuated. If so, as indicated by the presence of an initiating signal at the I/O port, the program branches to the cancel-drain routine discussed in connection with FIGS. 20 and 20A. If not, the display indicates the letters PF on the seven segment display indicating a power failure and the system goes into the idle mode portion of the main routine 200.

Main Routine

Figure 15:
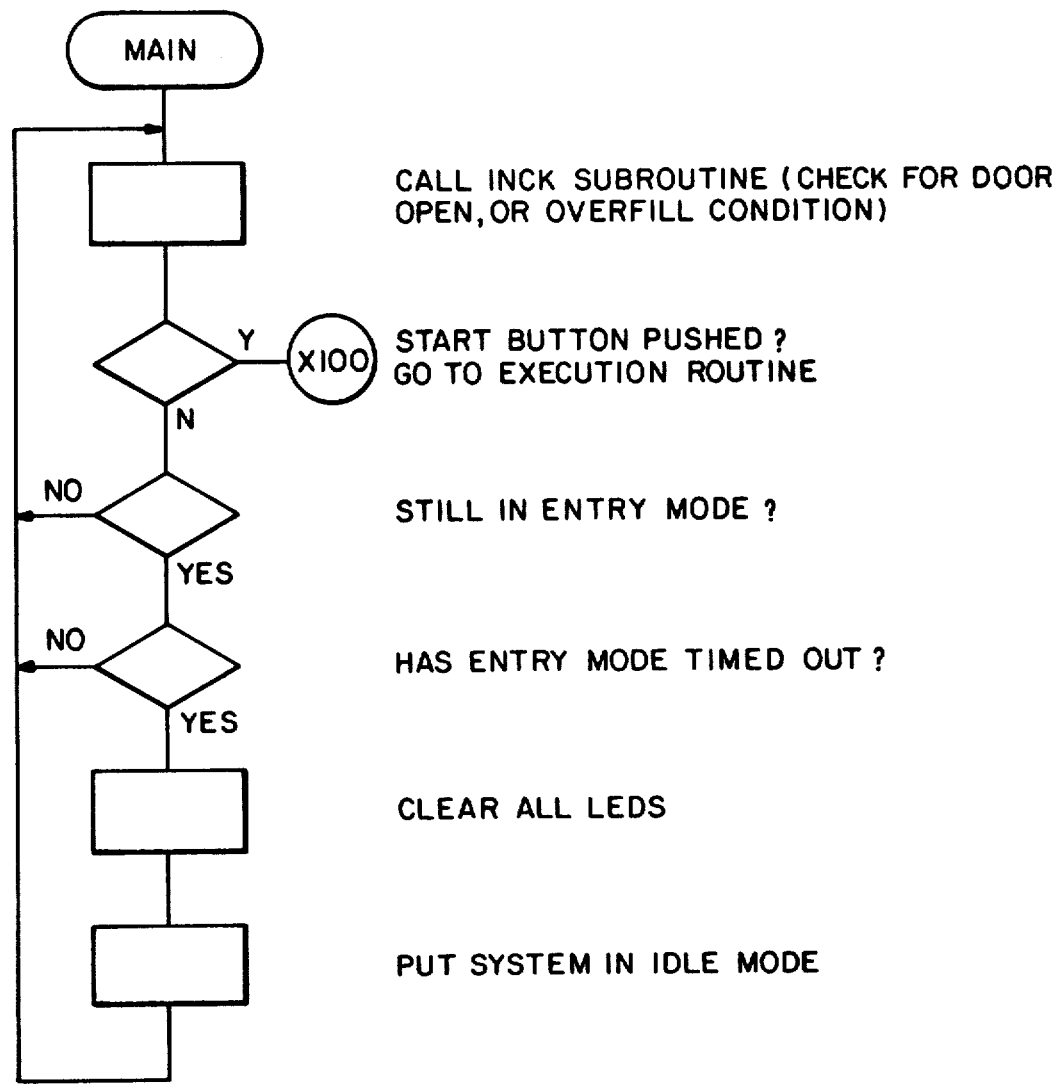
FIG. 15 is a flow diagram dipicting the Main Driver Routine of the microprocessor of FIG. 1.

As shown in FIG. 13, the main line routine of FIG. 15 is entered by any of the other routines upon completion or branching from such other routines. The main routine includes a branch to a cycle interruption control routine 204 which checks for an open door or a flood condition and if neither condition exists, a return is effected. If the start button has been pressed and accepted, the main program causes a branch to an execution driver program 202. If not, the program places the machine in the entry mode whereby the user can operate the cycle selection switches on the control panel. The system continues to loop in the main program until a preselected time period has passed after which the display is blanked and the system enters the idle mode which is essentially an off condition except for the microprocessor.

Execution Driver

Figure 16:
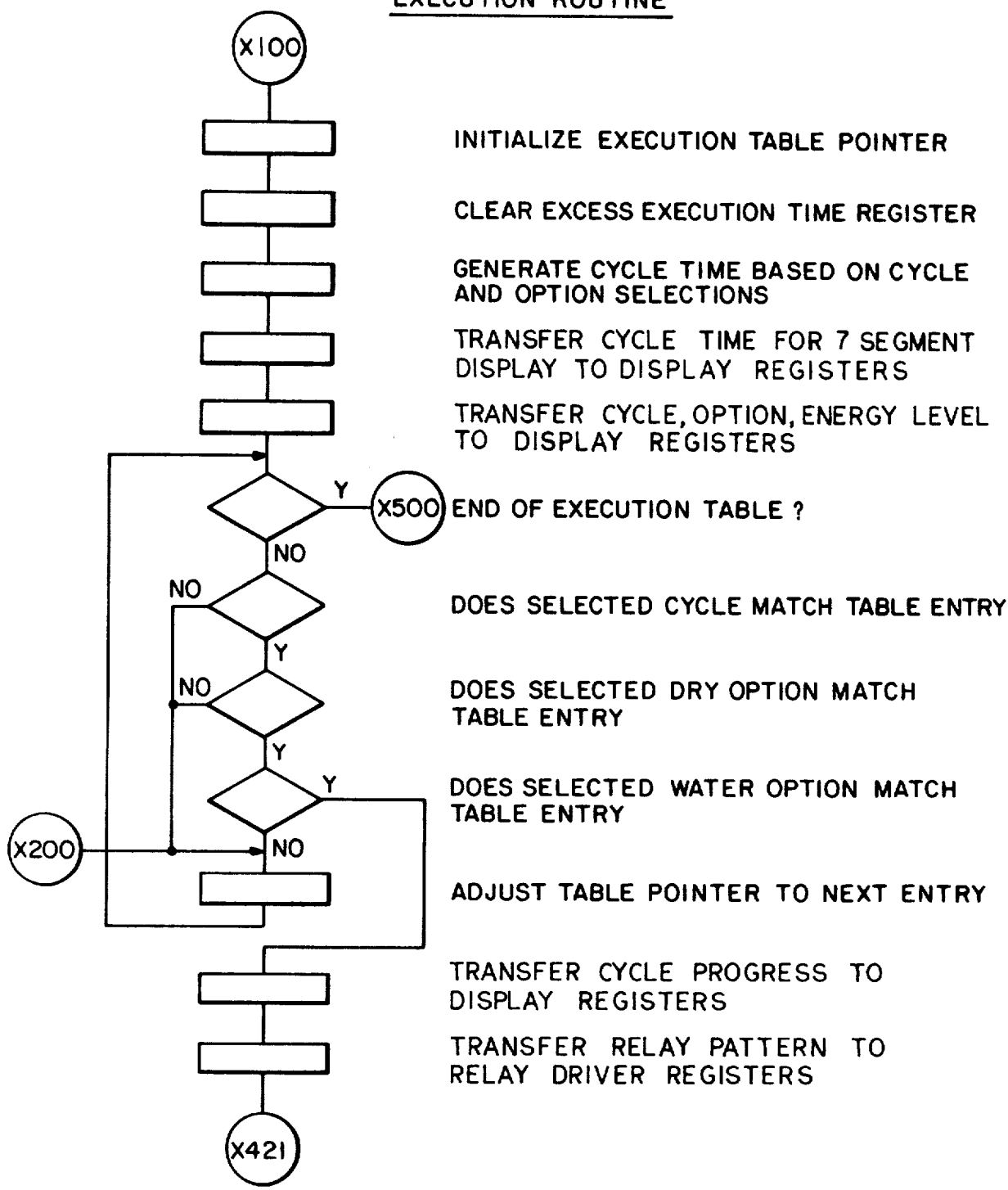
FIGS. 16 and 16A are flow diagrams depicting the Execution Routine of the microprocessor of FIG. 1.
Figure 16A:
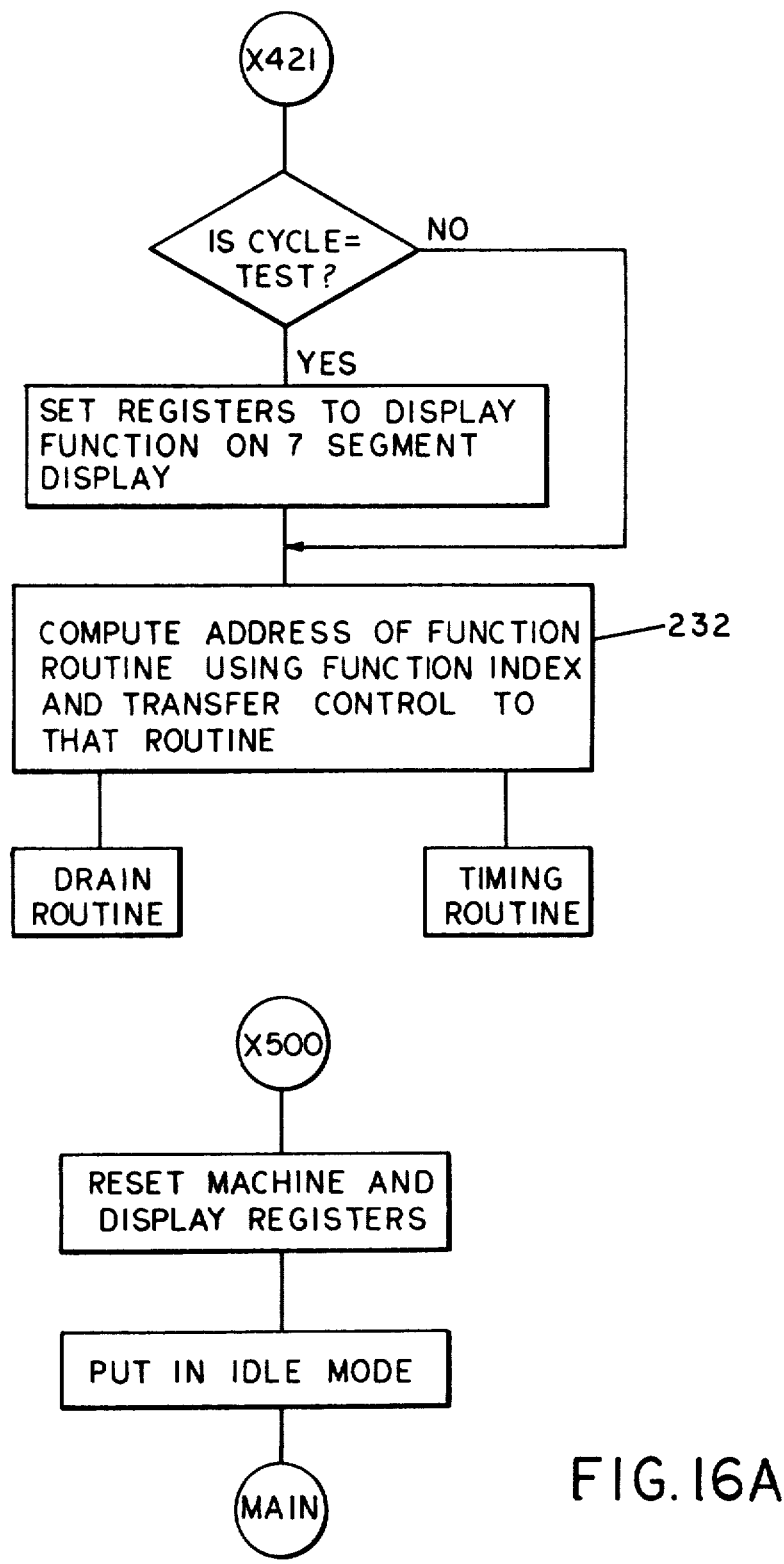

FIGS. 16 and 16A illustrate the execution routine. In summary, the microprocessor's internal timers are cleared and the stack pointer initialized. Next, the correct cycle times based on the cycles selected are generated from a look up table and stored in appropriate registers. The correct function sub-routine, wash, rinse, dry, drain, etc., is determined and a branch to that routine occurs at point 232 (FIG. 16A). The drain sub-routine is described in connection with FIG. 17. The timing sub-routine for the fill, circulate, detergent trip, rinse aid trip, and dry cycles is described in connection with FIG. 17A. Upon completing these sub-routines a return to the execution routine is effected at point X200. When execution is complete, a return to the main routine is accomplished at X500.

Drain Routine

Figure 17:
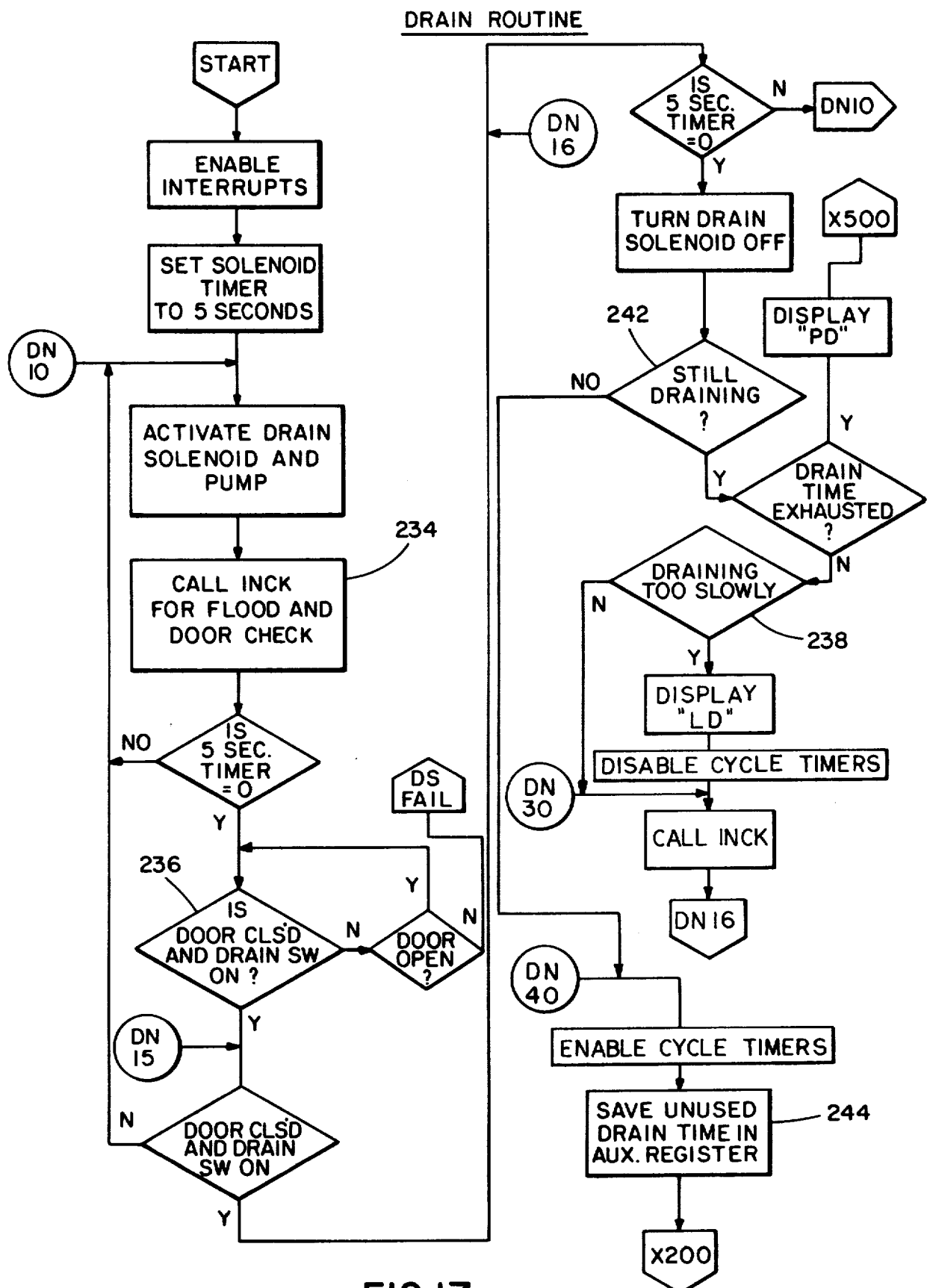
FIG. 17 is a flow diagram depicting the Drain Routine of the microprocessor of FIG. 1.

FIG. 17 illustrates the drain routine employed when a normal drain of the appliance is desired. During the course of the drain routine tests are performed on the drain feedback switch to detect drain system failure (DS), long drain (LD), and plugged drain (PD) conditions. If no fault conditions are detected upon completion of the drain cycle, execution returns to the execution routine at X200. The drain routine branches at point 234 to the INCK routine to detect possible flood or open door conditions. If neither is present, a return is effected and the drain solenoid 74 (FIG. 11) continues to be activated for five seconds. At the end of that time the drain switch 62 is interrogated at 236 to see if the diverter valve is correctly positioned. If not, a drain system failure is signalled and cycle operation terminates.

The time during which the drain switch is closed is monitored at 238 and, if excessive, draining continues with the front panel display indicating LD for long drain. If the switch remains closed at the end of the drain time PD is displayed at 240 and the cycle is interrupted due to a plugged drain.

The microprocessor based control circuit is capable of initiating a drain operation and then monitoring that operation on a real time basis to detect various malfunctions of the drainsystem. In the event of a long drain caused by partial blockage of the drain, the cycle continues to operate but the use is notified that service is required. In the event of a major failure of the drain system, as when the diverter valve fails to operate or the drain is plugged, the microprocessor terminates cycle operation to prevent flooding or damage to the system.

The drain function, during normal operation, continues only as long as necessary. This too is a distinct difference and advantage over conventional units. As soon as the drain switch returns to its normal position this is detected at 242 and the drain cycle is terminated. Any unused time in the normal drain cycle is transferred from the drain timing register to an auxiliary register at point 244 and the next cycle begins immediately. The excess time is not discarded, however, in order that the total cycle time is as initially programmed. The excess time is added to the next time insensitive cycle as, for example, a dwell period or a circulate period.

Cycle Timing Routine

Figure 17A:
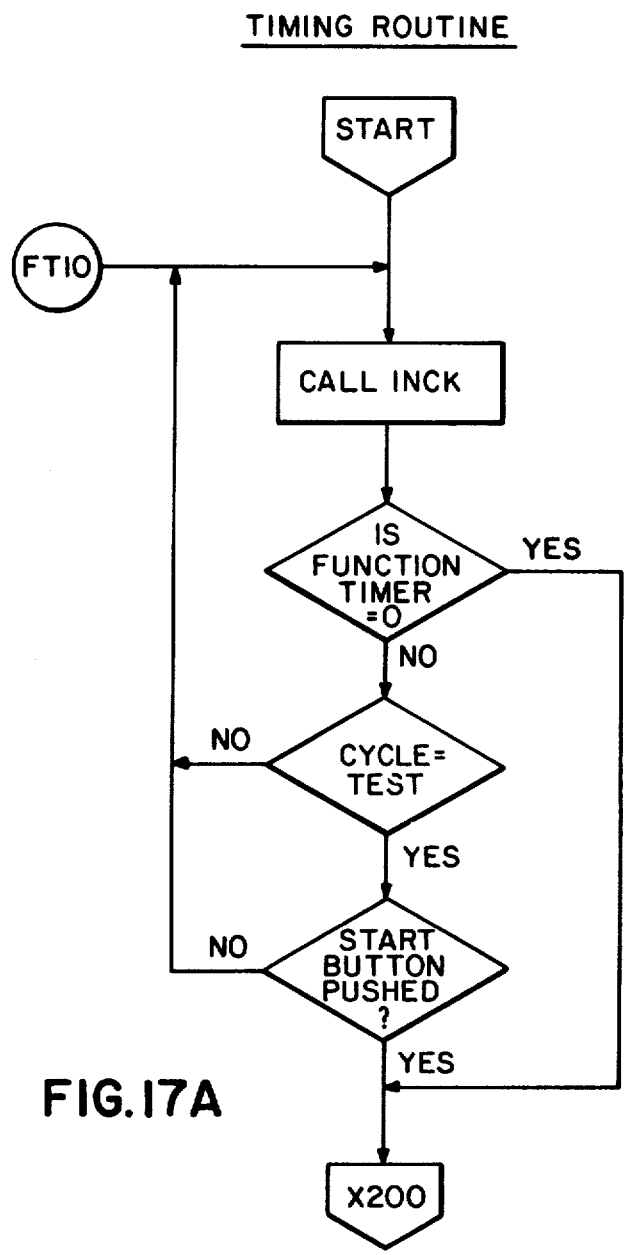
FIG. 17A is a flow diagram depicting the Timing Routine of the microprocessor of FIG. 1.

FIG. 17A is the cycle timing routine entered from the execution routine. This routine times the normal machine functions except the drain function. Upon time out control is transferred back to the execution routine at point X200.

External Interrupt Routine

Figure 18:
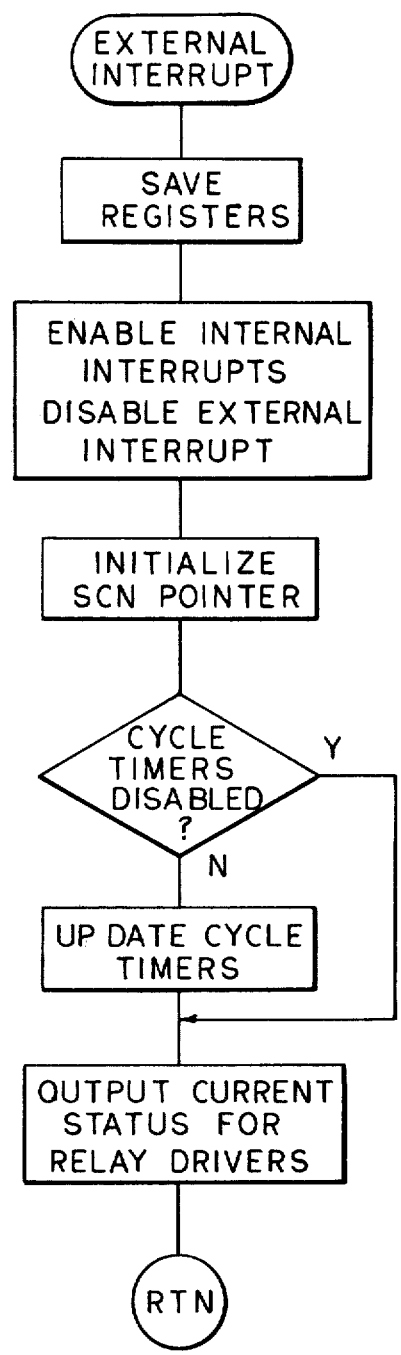
FIG. 18 is a flow diagram depicting the External Interrupt Routine of the microprocessor of FIG. 1.
Figure 19:
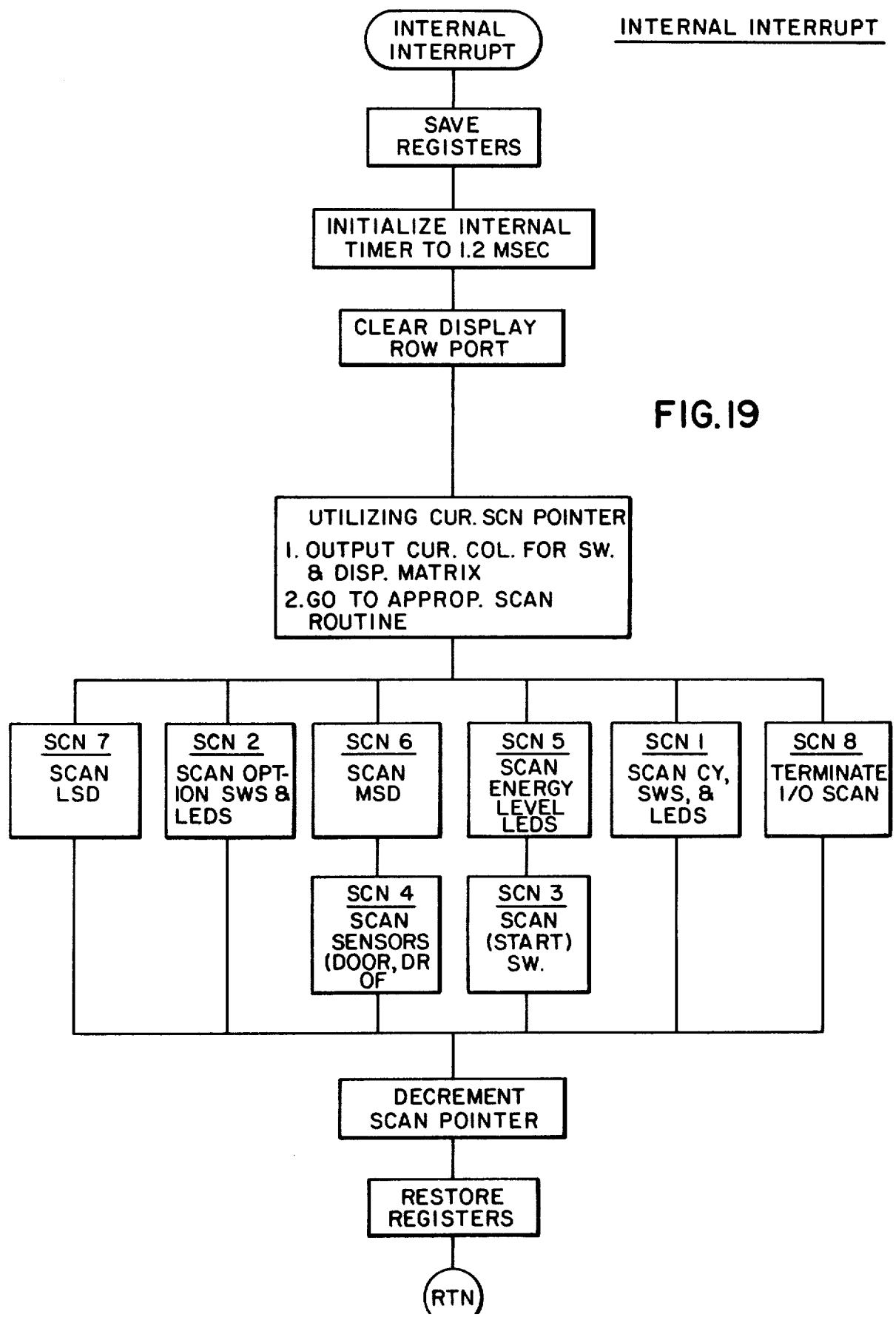
FIG. 19 is a flow diagram depicting the Internal Interrupt Routine of the microprocessor of FIG. 1.

Referring to FIG. 18, the external interrupt routine is illustrated. This interrupt routine is invoked whenever the processor detects a valid interrupt request. This request is generated by a high signal applied to the external interrupt pin of the microprocessor. This signal is derived by inverting the output of zero crossing detector circuit 66 (FIG. 12). This occurs at each zero crossing of the line frequency (every 8.33 milliseconds). The program enables internal interrupts while disabling further external interrupts. The current status of the relay drivers is also output by this routine.

Internal Interrupt

The internal interrupt (FIG. 19) is generated six times during the 8.33 millisecond time period following an external interrupt. These internal interrupts are spaced approximately 1.2 milliseconds apart. After saving data, control is transferred to SCN sub-routine 1 through 8, which perform all of the I/O for undating the panel display and inputting selections from membrane switches which may have been pushed.

Referring specifically to the SCN sub-routines, they are used to alternate between entry and display. The SCN pointer located in a microprocessor register indexes through each of the eight SCN routines. SCN1 updates and maintains the display LEDs and inputs selections from the cycle membrane switches. SCN2 maintains the option display lines and inputs option selections from the option switches. These include the water level and type of drying. SCN3 recognizes a start request. SCN4 determines the present status of the door, flood and drain switches. SCN5 maintains the energy level indicator display 102 on the front panel. SCN6 and SCN7 maintain the two digit seven segment displays on the front panel which display either a fault code or the time to cycle completion as previously described. SCN8 disables further internal interrupts and re-enables external interrupts. Upon execution of SCN8, the internal interrupts conclude and a return to the base level program is effected.

Cancel-Drain Routine

During execution of the power up routine following a reset of the microprocessor, the existence of a cancel-drain request is recognized when a high (logical one) signal is detected at the dedicated I/O port hereinbefore described and a drain cycle is initiated in accordance with the cancel-drain routine (FIGS. 20 and 20A) removing all water from the appliance and returning the program to the main routine 200. Included in the cancel-drain routine is drain failure detection similar to that described for the drain routine of FIG. 17. At point 250, a drain system failure is flagged if the drain switch is not properly positioned while at point 252 a long drain is flagged if excessive time is required to complete the drain function. The cancel-drain routine also includes branching to a door monitor routine 206 and to a flood routine 207 as appropriate.

Cycle Interruption Control (INCK)

This routine (FIG. 21) is called periodically to perform a set of standard interrupt checks. Checks are made for a flood condition or an open door. If either of these conditions exist, control is transferred to the appropriate routine otherwise a return to the appropriate routine is effected.

Door Monitor Routine

The door monitor routine (FIG. 21A) is used to suspend operation of the appliance and disable the cycle timer whenever the door is open. During this time a periodic check is made for the existence of a flood condition and, if detected, branching to the flood routine is effected. When the appliance door is closed, INCK returns program control to the appropriate portion of the base level program.

Flood Routine

Figure 21:
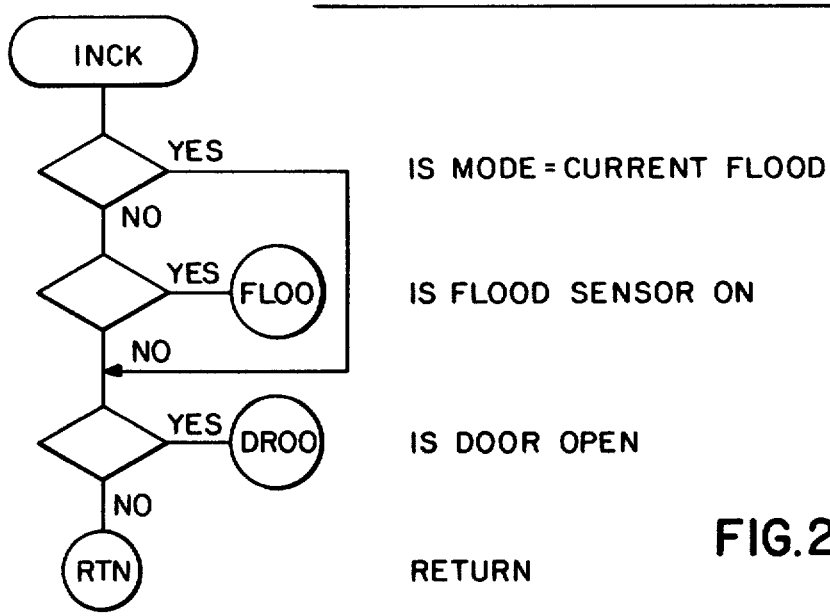
FIG. 21 is a flow diagram depicting the Cycle Interruption Control Routine of the microprocessor of FIG. 1.
Figure 21A:
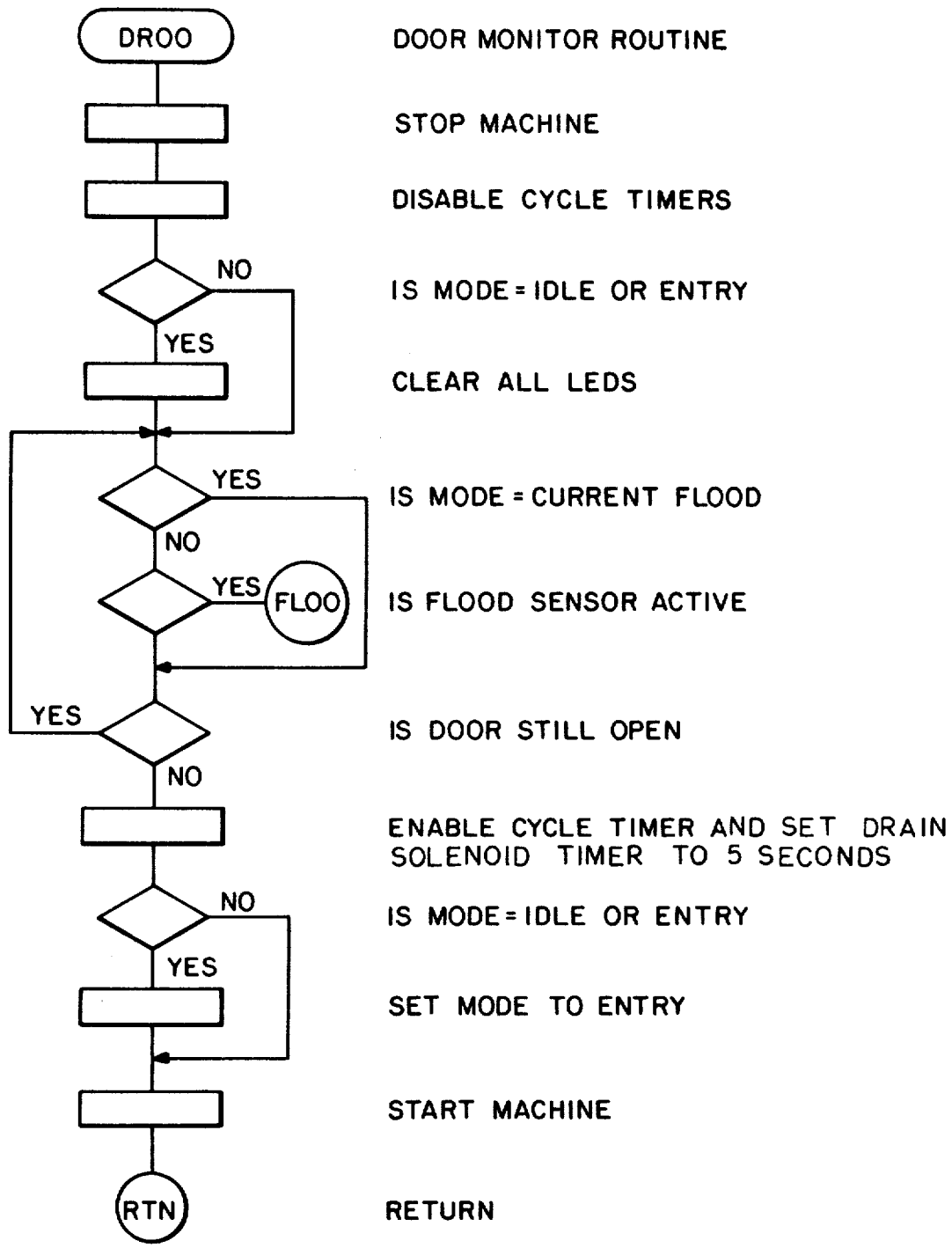
FIG. 21A is a flow diagram depicting the Door Monitor Routine of the microprocessor of FIG. 1.
Figure 21B:
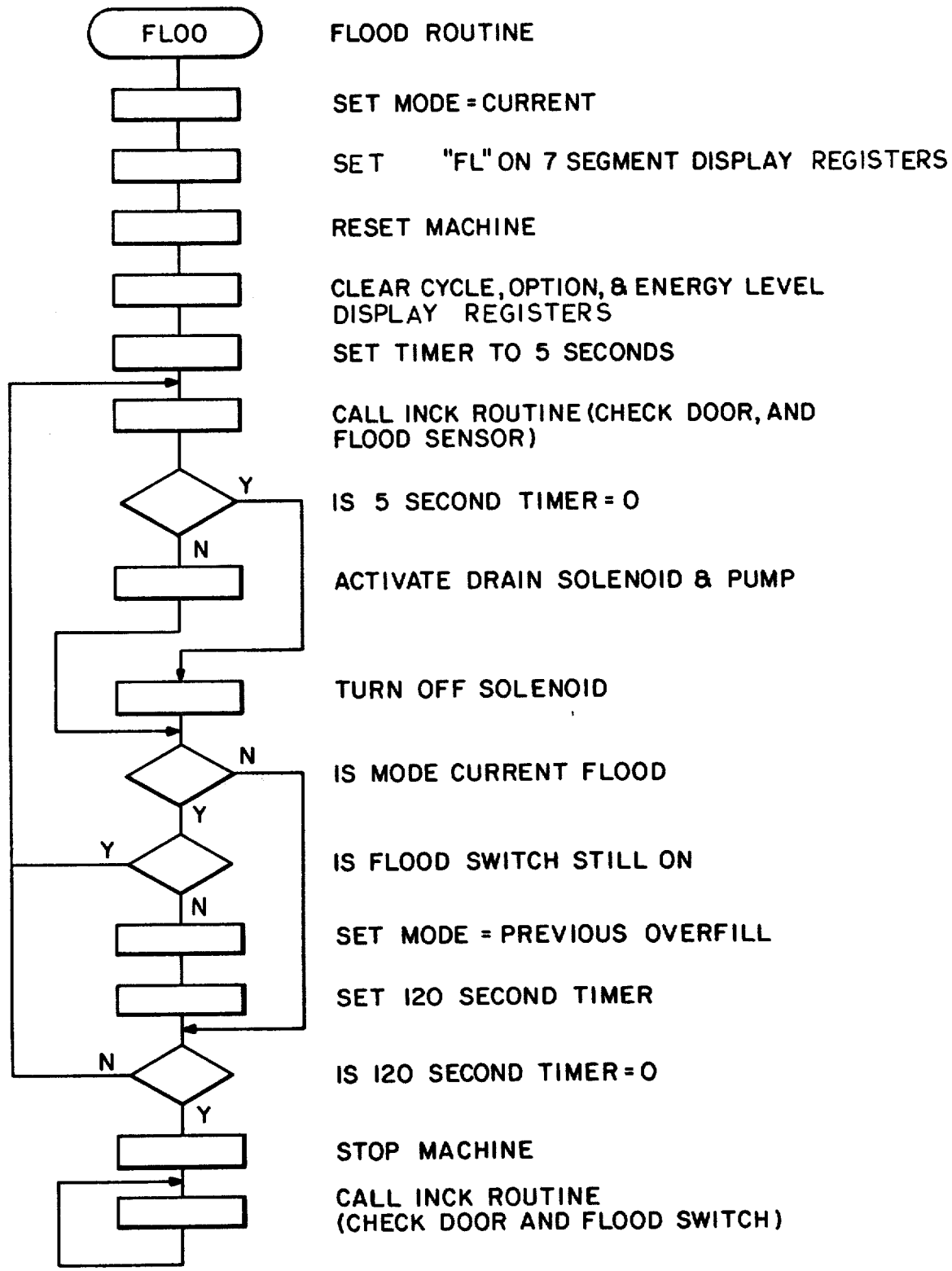
FIG. 21B is a flow diagram depicting the Flood Routine of the microprocessor of FIG. 1.

Referring to FIG. 21B, the flood protection routine is illustrated. This routine functions to pump out water in the machine whenever an overfill condition is recognized by the flood switch. The flood routine will be performed to the exclusion of any other function when an overfill is detected through INCK (FIG. 21) or the door monitor routine (FIG. 21A). The routine is closed looped and, once a flood condition is detected, program control cannot return to normal operation without user interaction in the form of operating the cancel-drain switch. The flood routine can be activated during machine operation or when the machine is off since the microprocessor remains on regardless of the state of the appliance. When the flood routine is entered it initiates a drain operation and maintains the draining operation until the flood switch has been reset to its normal position for a preselected time period. The flood routine displays FL on the two digit control panel display to signal this condition.

While I have shown and described an illustrative embodiment of this invention in some detail, it will be understood that this description and illustrations are offered merely by way of example, and that the invention is to be limited in scope only by the appended claims.

What is claimed is:

1. In a washing appliance having means for performing a plurality of operating functions including a drain function, a control circuit adapted for energization from an external power supply, said control circuit comprising:
   a microprocessor for controlling said plurality of function performing means to provide a plurality of operating modes including a drain mode in which the drain function is performed, and an idle mode in which no operating functions are performed, said microprocessor including a reset port and an input port, said microprocessor being constructed and arranged to assume a reset state thereby interrupting appliance operation, whenever a reset signal is present at its reset port at any time during appliance operation;
   means for generating an internal reset signal of limited duration and applying said internal reset signal to said reset port in response to restoration of power from the external supply following an interruption thereof;
   manually operable reset switch means having an actuated state and a deactuated state;
   means for generating a manual reset signal responsive to said reset switch means and operative to apply said manual reset signal to said reset port when said reset switch means is in its actuated state and to remove said manual reset signal when said reset switch means resumes its deactuated state;
   means for generating an initiating signal in response to said manual reset signal and operative to maintain said initiating signal at said input port for a predetermined period following removal of said manual reset signal from said reset port;
   said microprocessor being further constructed and arranged to scan said input port for the presence of an initiating signal following removal of a reset signal from its reset port and operative to initiate a first predetermined one of said operating modes if said initiating signal is detected and to initiate a second predetermined one of said operating modes otherwise;
   whereby in response to a manual reset appliance operation is interrupted and a first predetermined one of the operating modes is initiated and in response to an internal reset, a second predetermined one of the operating modes is initiated.

2. A control circuit in accordance with claim 1 wherein said first predetermined operating mode is said drain mode.

3. A control circuit in accordance with claim 1 wherein said second predetermined operating mode is said idle mode.

4. A control circuit in accordance with claim 1 wherein said first predetermined operating mode is said drain mode and said second predetermined operating mode is said idle mode.

5. A control circuit in accordance with claim 1 or claim 4 wherein said manual reset signal generating means comprises:
   first latch means having an input coupled to said manual reset switch means, a first output state for said first latch means being enabled when said switch means is in said actuated state, said first output state defining said manual reset signal.

6. A control circuit in accordance with claim 5 wherein said initiating signal generating means comprises a second latch means having an input coupled to the output of said first latch means, the output state of said second latch means following the output state of said first latch means delayed in time by a predetermined period, the first output state of said second latch means defining said initiating signal.

7. The control circuit in accordance with claim 6 further comprising means for generating a series of clock pulses equally spaced in time, the time between successive pulses defining a control interval, said clock pulse generating means being coupled to said first and second latch means for synchronizing operation of said first and second latch means with said clock pulses.

8. The control circuit in accordance with claim 7 wherein a change in state of said reset switch means enables a change in the output state of said first latch means and the first occurring clock pulse following said change of state of said reset switch means is effective to change the output state of said first latch means, and wherein a change in the output state of said first latch means enables said second latch means to change its output state, and the clock pulse succeeding said first occurring clock pulse is effective to change the output state of said second latch means whereby the output state of said second latch means follows the output state of said first latch means by a predetermined time period equal to one control interval.

9. A control circuit in accordance with claim 7 wherein deactuation of said reset switch means enables said first latch means to assume a second output state and the first occurring clock pulse following deactuation of said reset switch means is effective to place said first latch means in its second output state, thereby removing said manual reset signal from said reset port and the second output state of said first latch means enables said second latch means to assume its second output state and the clock pulse succeeding said first occurring clock pulse is effective to place said second latch means in its second output state, thereby removing said initiating signal from said input port, whereby the initiating signal remains at said input port for a period of time equal to one control interval following removal of said manual reset signal from said reset port.

* * * * *